US012361455B2

(12) United States Patent
Zavesky et al.

(10) Patent No.: US 12,361,455 B2
(45) Date of Patent: Jul. 15, 2025

(54) METHOD AND SYSTEM FOR PERSONALIZING METAVERSE OBJECT RECOMMENDATIONS OR REVIEWS

(71) Applicant: AT&T Intellectual Property I, L.P., Atlanta, GA (US)

(72) Inventors: Eric Zavesky, Austin, TX (US); Jean-Francois Paiement, Sausalito, CA (US); Aritra Guha, Edison, NJ (US); Qiong Wu, Bridgewater, NJ (US); Wen-Ling Hsu, Bridgewater, NJ (US); Jianxiong Dong, Pleasanton, CA (US); Tan Xu, Bridgewater, NJ (US)

(73) Assignee: AT&T Intellectual Property 1, L.P., Atlanta, GA (US)

( * ) Notice: Subject to any disclaimer, the term of this patent is extended or adjusted under 35 U.S.C. 154(b) by 184 days.

(21) Appl. No.: 17/841,045

(22) Filed: Jun. 15, 2022

(65) Prior Publication Data

US 2023/0410159 A1    Dec. 21, 2023

(51) Int. Cl.
*G06Q 30/0282* (2023.01)
*G06Q 30/0201* (2023.01)

(52) U.S. Cl.
CPC ..... *G06Q 30/0282* (2013.01); *G06Q 30/0201* (2013.01)

(58) Field of Classification Search
CPC ............... G06Q 30/0202; G06Q 30/0201
See application file for complete search history.

(56) References Cited

U.S. PATENT DOCUMENTS

| 9,569,499 | B2 * | 2/2017 | Kami ................. G06F 16/9535 |
| 9,652,797 | B2 * | 5/2017 | Vijayaraghavan .... G06F 16/951 |
| 9,904,949 | B1 * | 2/2018 | Tavernier ........... G06Q 30/0631 |
| 11,954,258 | B1 * | 4/2024 | Agrawal ................. G06T 7/246 |
| 11,995,739 | B2 * | 5/2024 | LeCesne ............... G06V 20/20 |
| 12,135,753 | B2 * | 11/2024 | Jia ....................... G06F 16/9535 |

(Continued)

OTHER PUBLICATIONS

Li, Kai; Towards Ubiquitous Semantic Metaverse: Challenges, Approaches, and Opportunities, Dec. 15, 2023, IEEE Internet of Things Journal, vol. 10, No. 24. 21855-21872 (Year: 2023).*

(Continued)

*Primary Examiner* — Dylan C White
(74) *Attorney, Agent, or Firm* — Guntin & Gust, PLC; Kenneth S. Kwan

(57) ABSTRACT

Aspects of the subject disclosure may include, for example, obtaining contextual information associated with a user, wherein the user is engaged in an immersive environment using a target user device, and wherein the contextual information comprises user profile data, data regarding a location of the user, data regarding one or more inputs provided by the user, or a combination thereof, receiving data regarding a metaverse object in the immersive environment, determining a relevance of the metaverse object to the user based on the contextual information and the data regarding the metaverse object, responsive to the determining the relevance of the metaverse object to the user, generating a personalized recommendation or review of the metaverse object for the user, and causing the personalized recommendation or review to be provided to the user in the immersive environment for user consumption. Other embodiments are disclosed.

20 Claims, 9 Drawing Sheets

(56) References Cited

U.S. PATENT DOCUMENTS

| | | | | |
|---|---|---|---|---|
| 2013/0185294 | A1* | 7/2013 | Kami | G06F 16/335 |
| | | | | 707/732 |
| 2017/0169611 | A1* | 6/2017 | Ramirez Flores | G06T 19/20 |
| 2018/0018396 | A1* | 1/2018 | Roundtree | G06F 3/0482 |
| 2019/0065960 | A1* | 2/2019 | Taylor | G06N 20/00 |
| 2022/0156797 | A1 | 5/2022 | Paiement et al. | |
| 2022/0230404 | A1* | 7/2022 | Powderly | G06F 3/012 |
| 2023/0281940 | A1* | 9/2023 | Shen | G06T 19/006 |
| | | | | 345/419 |
| 2023/0377023 | A1* | 11/2023 | Buzzell | G06Q 30/0641 |

OTHER PUBLICATIONS

Beck, Dennis; Educational Practices and Strategies with Immersive Learning Environments: Mapping of Reviews for Using the Metaverse, 2024, IEEE Transactions on Learning Technologies, vol. 17, pp. 319-341 (Year: 2024).*

"The Future is Wide Open (Explore the Future)", https://future.criteo.com, May 17, 2022, 12pp.

\* cited by examiner

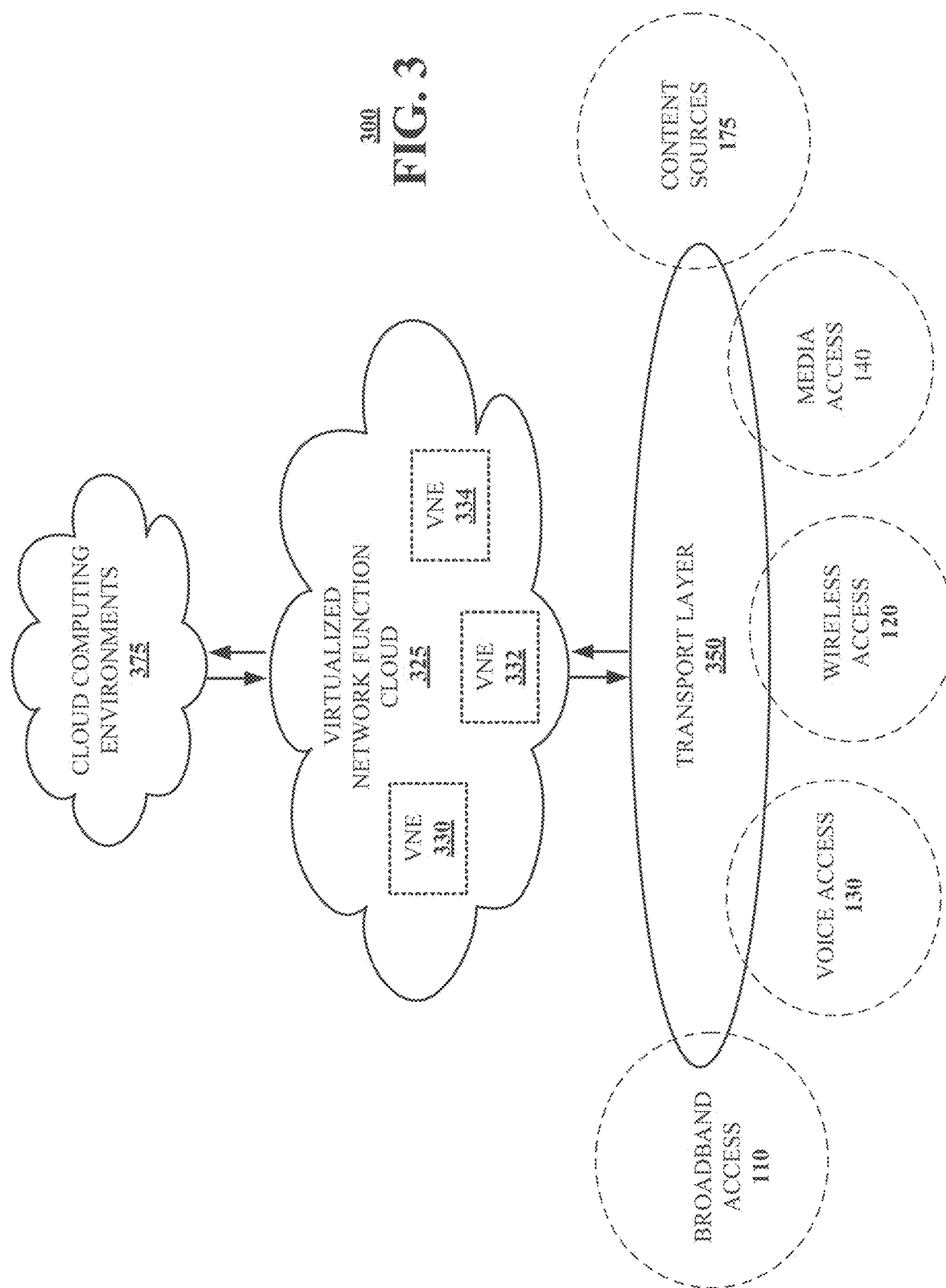

METHOD AND SYSTEM FOR PERSONALIZING METAVERSE OBJECT RECOMMENDATIONS OR REVIEWS

FIELD OF THE DISCLOSURE

The subject disclosure relates to personalizing recommendations or reviews of metaverse objects.

BACKGROUND

Extended reality (XR) environments provide user experiences that can mimic those in the real, physical world. For instance, the metaverse may offer an augmented reality (AR), virtual reality (VR), or mixed reality (MR) environment where users can explore, play, shop, socialize, or otherwise engage themselves in digitally-created spaces.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
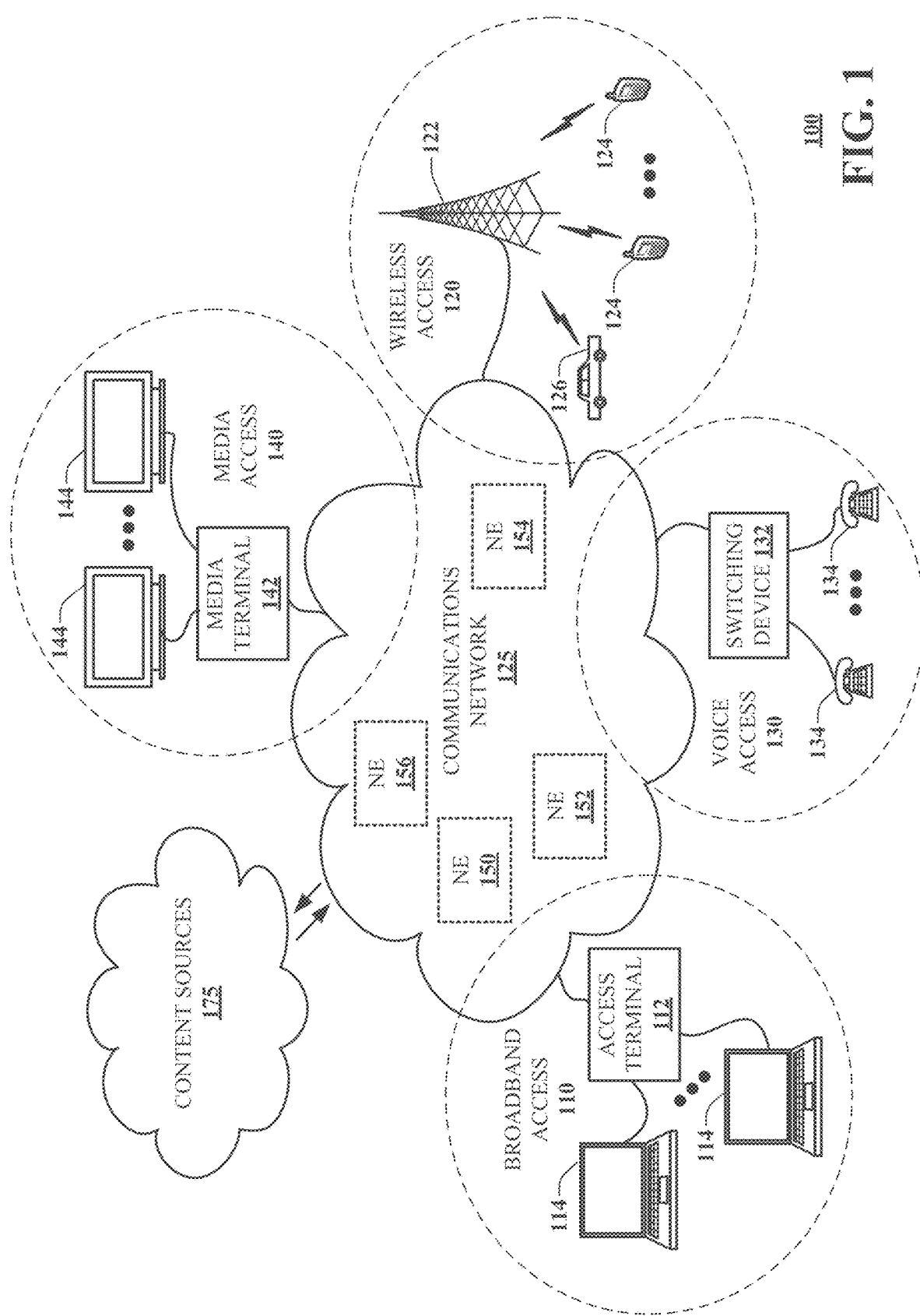
FIG. 1 is a block diagram illustrating an exemplary, non-limiting embodiment of a communications network in accordance with various aspects described herein.

A metaverse object (i.e., an immersion) may include one or more user-interactable AR-, VR-, or MR-based constructs (e.g., three-dimensional (3D) graphic(s)/item(s), video object(s), audio object(s), and/or the like) that are designed to provide an immersive user experience. For example, a metaverse object may include a virtual character or pathway that, when engaged by a user, interacts with the user (e.g., moves or talks with the user) and/or leads the user into an immersion (e.g., guides the user along a route, transitions the immersive environment to a different room or place, shows the user a video, etc.). In the metaverse, there may be numerous metaverse objects that are available for user engagement. Because of the sheer number of available immersions, however, a user can experience sensory overload, which can make it difficult for the user to identify the objects that most warrant the user's attention.

The generation and presentation (or creation and consumption) of recommendations or reviews in existing systems appear to be lacking or poorly defined. Some systems derive reviews or suggestions based solely on user-provided text-based comments or feedback consultations, which can be falsified or vague. Other systems derive recommendations or conduct targeted advertising based solely on user profile data or historical activities, which only shallowly represent the true or actual experience of a user. Also, determining the relevance of a prior user review to a current target user based merely on the target user's profile data can also be inadequate, since macro (often human-defined) categories for grouping similar reviews of an object may not accurately reflect the motivation behind the object (or any common factors shared with other objects).

The subject disclosure describes, among other things, illustrative embodiments of an immersion evaluation platform that is capable of providing automated generation and coordination of personalized recommendations or reviews of metaverse objects. In exemplary embodiments, the immersion evaluation platform may generate or provide personalized recommendations or reviews of a metaverse object based on user input or context (e.g., the user's profile data (such as demographic information, historical activity information, information regarding the user's social network interactions and contacts, information regarding the user's interests, etc.), the user's location, the user's present request, activity, or agenda, and/or the like) as well as based on (e.g., digital passive non-user created) usage information associated with the metaverse object or other metaverse objects.

Usage information may include requirements and/or objectives specified by a creator or provider of the metaverse object (e.g., an identifier or ID of the metaverse object, the minimum and/or recommended connection bandwidth or speed for experiencing the metaverse object, the "best" frame rate for experiencing the metaverse object, the minimum and/or recommended XR device (processing, memory, graphics, network communications, etc.) capabilities for experiencing the metaverse object, dimensions of the metaverse object and/or characteristics or other parameters associated with the metaverse object, the possible types of interactions with the metaverse object (e.g., gesture-based interactions, voice-based interactions, etc.), the type or theme of the metaverse object (e.g., for play, for entertainment, for education, etc.), the complexity or sophistication level of the metaverse object (e.g., for beginners, for intermediate-level users, for advanced users, etc.), the inputs that are accepted by the metaverse object (e.g., types of commands, types of requests, etc.), the outputs that the metaverse object may provide (e.g., video presentations, monetary rewards, lead-ins or triggers to join other immersions, etc.), and/or the like).

Usage information may additionally, or alternatively, include data regarding the devices and/or networks associated with the users that have previously engaged with the metaverse object (e.g., throughputs relating to the user engagements with the metaverse object, network latencies experienced by users during the engagements, specifications or capabilities of the devices (relating to processing, memory, graphics, etc.) employed by the users for the engagements, etc.).

Usage information may additionally, or alternatively, include data regarding the contexts of users that have previously engaged with the metaverse object (e.g., the users' locations, interests, etc.), the actual user inputs that were provided to the metaverse object during the user engagements, and/or corresponding outputs there were provided by the metaverse object as part of those engagements.

Usage information may additionally, or alternatively, include statistics on the various user interactions with the metaverse object, such as, for example, the total/average object engagement time for one or more users, the total/average number of return visits to the metaverse object by one or more users, user biometric data (e.g., regarding breathing rate, heart rate, perspiration, temperature, body movements, etc.) during interactions with the metaverse object, etc.

In various embodiments, usage information may relate to individual user interactions with the metaverse object (e.g., specific contextual usages) and/or aggregate user interactions with the metaverse object (e.g., interactions by all users that have engaged with the metaverse object or similar metaverse objects, interactions by some or all of a user's social contacts that have engaged with the metaverse object or similar metaverse objects, etc.).

In one or more embodiments, the immersion evaluation platform may augment the creation/retrieval of personalized recommendations or reviews with the usage information. In exemplary embodiments, the immersion evaluation platform may be capable of monitoring user interactions with a metaverse object to derive some or all of the usage information (e.g., latencies experienced, device capabilities or status, return visits, inputs to/outputs from the metaverse object, etc.), storing and updating the usage information (e.g., updating usage records, biometrics, throughput data, latency data, system performance data, etc. for repeat visits to the metaverse object over time), and utilizing the usage information as part of identifying or generating personalized recommendations or reviews of the metaverse object or other metaverse objects.

As a metaverse object may (in contrast to a classical review target) provide different content or immersive experiences that are specific to individual users, the aggregate information relating to the metaverse object—e.g., the different user contexts and interests and the different usage information, such as the different users' inputs, the different object outputs, the different forms or formats of the metaverse object that were experienced during user engagements, the device/network capabilities or conditions during user engagements, and so on—may encompass or "capture" all of these experiences, and may be analyzed or dissected to determine the relevancy of the metaverse object for subsequent users and leveraged to derive recommendations or reviews of the metaverse object or other metaverse objects.

As described in more detail below, the immersion evaluation platform may additionally, or alternatively, be capable of generating personalized recommendations or reviews of a metaverse object for a user based on determined similarities between the user and the user's social contacts or cohorts and/or by filtering and adapting prior user reviews/scores of the metaverse objects.

In various embodiments, the immersion evaluation platform may identify and score explicit object-related events, timing of interactions, and/or objective user reactions, attribute the score(s) to one or more review sentiments, and utilize the score(s) as part of generating a personalized recommendation or review of a metaverse object. Scoring may additionally, or alternatively, be performed based on a size (e.g., dimensions) of the metaverse object, a volume level of any object-related audio, a visual intensity or transparency of any object-related events (e.g., special effects, temporary advertising image(s), etc.), a motion or overall change frequency of object-related content/events (e.g., high-speed motion for engagement with an adventure-based engagement object, flickering images for a light- or fireworks-related object, etc.), and/or the like.

As described in more detail below, the immersion evaluation platform may be capable of performing additional functions, including obtaining user feedback on metaverse objects and/or on personalized recommendations or reviews of those metaverse objects, notifying object creators/providers of the user feedback, modifying recommendations or reviews based on the user feedback, aggregating the user feedback, etc.

Embodiments of automated generation and coordination of personalized recommendations or reviews of metaverse objects or immersions, as described herein, facilitate efficient user consumption of those recommendations or reviews, which improves overall user experience in the metaverse. Leveraging data regarding metaverse object engagement metrics, passive features (e.g., latency experienced, user biometrics, etc.), and/or the specific similarities of user cohorts allows the immersion evaluation platform to formulate a much stronger signal for identifying the relevancy of a metaverse object to a user, which enables the creation of multi-faceted recommendations or reviews that are more useful and actionable. Further, aggregate reviews from user cohorts (e.g., friends or contacts in a user's social network) and/or an individual's prior user review history (e.g., prior user reviews provided for various metaverse objects) can be leveraged to generate personalized recommendations or reviews that jointly reflect both horizontal and vertical interests/feedback.

In the metaverse, digital transactions/interactions may be "transferrable" (i.e., may apply similarly) among different metaverse objects in the same class (e.g., games, videos, visual representations, papers, etc.) or among different users in the same class (e.g., gamers, artists, action fanatics, etc.), and thus allows the relevancy or similarity between different objects and/or users to be determined via cross-matching or comparisons using the vast array of available digital transactions/interactions data. Embodiments of the immersion evaluation platform may leverage this transferability as part of generating personalized recommendations or reviews. For instance, different modalities of interactions with an object (e.g., gesture-based interactions versus voice-based interactions to obtain tokens from the object) may be "grouped" as similar actions and factored into the creation of personalized recommendations or reviews. As another example, the same interaction with different objects in the same class (e.g., punching of a punching bag object and punching of a speed bag object) may be grouped as similar actions for similar objects. As another example, contextual dependencies, such as, for instance, information regarding common actions or activities shared by two or more users may be associated with one another and used as part of generating personalized recommendations or reviews for different users.

In exemplary embodiments, the immersion evaluation platform may selectively filter which metaverse objects to present recommendations or reviews for (e.g., based on context, based on user interest, or other criteria described herein). Because a user viewport may be very "busy" in the metaverse (where numerous digital and physical objects may be present) and because XR devices generally have a limited field of view (FOV), filtering the generation and/or presentation of recommendations or reviews reduces search/compute costs, which conserves network resources, computing resources, and/or power resources. This improves overall system performance and also aids user screening or sorting of the various available objects, which alleviates visual congestion issues in the metaverse.

In certain embodiments, the immersion evaluation platform may, by way of selective presentation of personalized recommendations or reviews, steer a user to metaverse object(s) that are most likely to be of interest, and permit increased throughput for those object(s). In these embodiments, the immersion evaluation platform may "fade" other object(s) determined to be uninteresting to the user so as to reduce or eliminate the throughput/network load associated with such objects, which can further conserve system resources. For instance, rendering of determined uninteresting object(s) may be partially or entirely blocked.

Embodiments of the immersion evaluation platform may provide personalized recommendations or reviews in summary form and may include details on how they are aggregated or derived, which allows a user to consume the recommendations or reviews quickly and ascertain an object's purpose, features, and/or requirements. This further helps the user focus on metaverse objects of potential interest and saves the user from engaging with other objects that are likely to waste the user's time.

Various embodiments of the immersion evaluation platform may also be leveraged to generate personalized recommendations or reviews of immersive advertising objects, which provides additional marketing opportunities for advertisers.

One or more aspects of the subject disclosure include a device, comprising a processing system including a processor, and a memory that stores executable instructions that, when executed by the processing system, facilitate performance of operations. The operations can include obtaining contextual information associated with a user, wherein the user is engaged in an immersive environment using a target user device, and wherein the contextual information comprises user profile data, data regarding a location of the user, data regarding one or more inputs provided by the user, or a combination thereof. Further, the operations can include receiving data regarding a metaverse object in the immersive environment. Further, the operations can include determining a relevance of the metaverse object to the user based on the contextual information and the data regarding the metaverse object. Further, the operations can include, responsive to the determining the relevance of the metaverse object to the user, generating a personalized recommendation or review of the metaverse object for the user. Further, the operations can include causing the personalized recommendation or review to be provided to the user in the immersive environment for user consumption.

One or more aspects of the subject disclosure include a non-transitory machine-readable medium, comprising executable instructions that, when executed by a processing system including a processor, facilitate performance of operations. The operations can include determining whether a user has an affinity with an immersion, wherein the user is engaged in an immersive environment associated with the immersion, and wherein the determining is performed based on contextual information associated with the user and based on data regarding the immersion. Further, the operations can include, responsive to a determination that the user has the affinity with the immersion, deriving a personalized recommendation or review of the immersion for the user. Further, the operations can include generating embedding data that includes the personalized recommendation or review. Further, the operations can include providing the embedding data to an immersion engine for rendering of the personalized recommendation or review in the immersive environment. Further, the operations can include obtaining user feedback on either or both of the immersion and the personalized recommendation or review. Further, the operations can include transmitting, to one or more parties relating to the immersion, a notification regarding the user feedback to facilitate updating of the immersion or to promote additional user engagements with the immersion.

One or more aspects of the subject disclosure include a method. The method can comprise determining, by a processing system including a processing, whether a metaverse object is relevant to a user based on an input or a determined context associated with the user, based on user profile data associated with the user, and based on data regarding the metaverse object, wherein the user is engaged in an immersive environment using one or more target user devices. Further, the method can include, responsive to a determination that the metaverse object is relevant to the user, creating, by the processing system, a personalized recommendation or review of the metaverse object for the user. Further, the method can include providing, by the processing system, the personalized recommendation or review to the immersive environment for user consumption. Further, the method can include modifying, by the processing system, the personalized recommendation or review based on user feedback regarding the personalized recommendation or review, resulting in a modified personalized recommendation or review. Further, the method can include causing, by the processing system, the modified personalized recommendation or review to be presented in the immersive environment.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, automated generation and coordination of personalized recommendations or reviews of metaverse objects. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
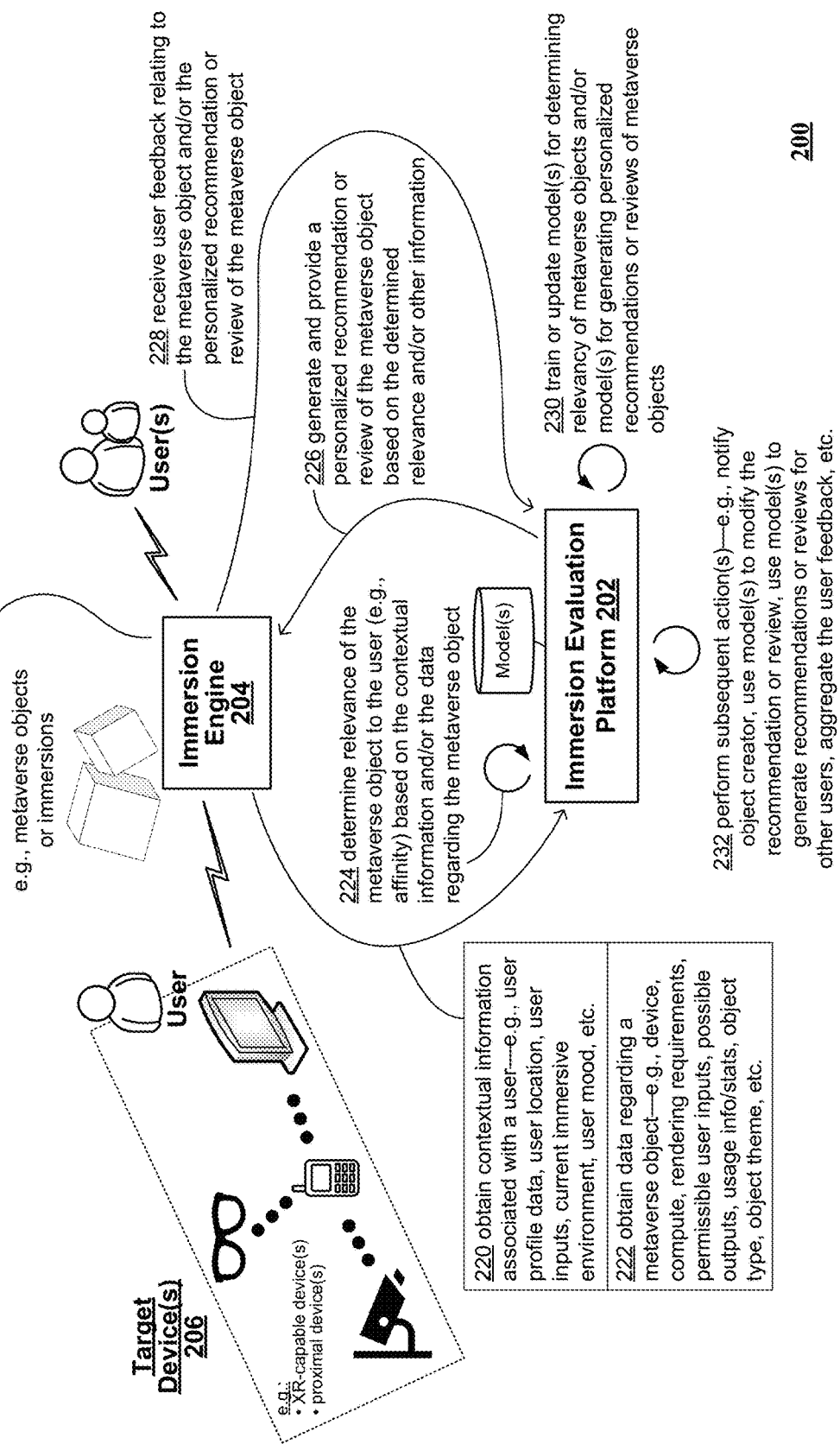
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 functioning in, or in conjunction with, the communications network 100 of FIG. 1 in accordance with various aspects described herein.

As shown in FIG. 2A, the system 200 may include an immersion evaluation platform 202, an immersion engine 204, and target device(s) 206. The immersion evaluation platform 202 may include one or more server devices configured to provide one or more functions or capabilities relating to automated generation and coordination of personalized recommendations or reviews of metaverse objects. The immersion engine 204 may include one or more server devices configured to provide one or more functions or capabilities relating to facilitating and managing immersive environments or experiences for users. In various embodiments, the immersion engine 204 may provide AR environments, VR environments, or a combination of both in the metaverse. The target device(s) 206 may be associated with a user, and may include one or more devices capable of receiving, generating, storing, processing, and/or providing data (e.g., audio data, video data, XR data, text data, control data, etc.) relating to the immersion evaluation platform 202 and/or the immersion engine 204. For example, a target device 206 can include a communication and/or computing device, such as a mobile phone (e.g., a smart phone, a radiotelephone, etc.), a desktop computer, a laptop computer, a tablet computer, a handheld computer, a display device, a gaming device, a wearable communication device (e.g., a smart wristwatch, a pair of smart eyeglasses, media-related gear (e.g., a pair of AR, VR, MR glasses, a headset, headphones, and/or the like), etc.), a similar type of device, or a combination of some or all of these devices.

Although not shown, some or all of the immersion evaluation platform 202, the immersion engine 204, and the target device(s) 206 may be communicatively coupled with one another over one or more networks. The networks may include one or more wired and/or wireless networks. For example, the networks may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

It is to be appreciated and understood that the system 200 can include any number/types of users, target devices, platforms, engines, and networks, and thus the number/types of users, target devices, platforms, engines, and networks, shown in, or described with respect to, FIG. 2A are for illustrative purposes only.

As described in more detail below, the immersion evaluation platform 202 may leverage user inputs/context (e.g., the user's profile data, the user's location, the user's present request, activity, or agenda, and/or the like), usage information associated with the metaverse object or other metaverse objects (e.g., data regarding metaverse object engagement metrics, passive features such as latency experienced or user biometrics, etc.), and/or the specific similarities of user cohorts to generate or provide personalized recommendations or reviews of a metaverse object. In various embodiments, the immersion evaluation platform 202 may detect user inputs or context and/or obtain the usage information and user similarity data based on communications with the immersion engine 204, the target device(s) 206, and/or other servers or devices.

In various embodiments, the immersion evaluation platform 202 may include, or otherwise, be integrated with the immersion engine 204. For example, immersion evaluation platform 202 and the immersion engine 204 may be implemented in a common server device and/or device(s). Integration of the immersion evaluation platform 202 and the immersion engine 204 in this manner enables rapid and dynamic provision of personalized recommendations or reviews of metaverse objects in an immersive environment, including (e.g., real-time or near real time) fine-tuning of vectors and/or other data representative of different user behaviors in the immersive environment. In one or more embodiments, the immersion evaluation platform 202 and the immersion engine 204 may alternatively be separately implemented (e.g., implemented in a different server device or device(s)), but may be communicatively coupled to one another to exchange immersive environment-related and/or user behavior-related data.

As shown by reference number 220 of FIG. 2A, the immersion evaluation platform 202 may obtain contextual information associated with the user. In various embodiments, the immersion evaluation platform 202 may obtain the contextual information based on communications with the immersion engine 204 and/or the target device(s) 206. For instance, the user may use the target device(s) 206 to engage in an immersive environment facilitated by the immersion engine 204, and the immersion evaluation platform 202 may receive data regarding the user and/or the engagement from the immersion engine 204.

The contextual information may include user profile data (e.g., associated with the user, associated with a class of users that includes the user, and/or associated with users in general), data regarding a location of the user (or a present navigation of the user to a location), data regarding inputs provided by the user (e.g., voice-based commands, gesture-based commands, and so on), data regarding a present expression of interest or intent of the user (e.g., a media content item (e.g., video, audio, etc.) that the user has requested or is presently consuming, a topic or subject identified by the user, etc.), data regarding an immersive environment or content that the user is currently engaged (e.g., inputs from the user to an immersion, outputs provided by the immersion to the user based on those inputs, a theme of the immersive environment such as activities associated with the immersive environment (e.g., car driving, fishing, etc.), etc.), data regarding applications or immersions related to the immersive environment (e.g., advertising applications or other immersions that interact with, are linked to, or that can otherwise be selectively experienced via or through the immersive environment, etc.), calendar/travel-related data associated with the user (e.g., that identify the user's current/upcoming schedule and/or travel route), data regarding a present time of day, weather data, data regarding structures (e.g., buildings or other objects) at or near the location, and/or the like. In various embodiments, the contextual information may relate to people, objects, and/or events occurring in proximity to, or associated with, the user.

In one or more embodiments, the user profile data may include information in two-dimensional (2D) digital domains (e.g., web sites, smartphone apps, etc.), such as information regarding preferences of the user (e.g., historical explicit preferences, including advertisement placement policy restrictions, opt-in or opt-out preferences, or the like), user behaviors and/or interests (e.g., historical behaviors, such as Internet browsing activities, content consumption (e.g., videos, games, etc.), purchase histories, immersion-related behavior, and/or the like), demographics of the user (e.g., age of the user, gender of the user, etc.), advertisement responses of the user (e.g., advertisement exposures, click-through actions, affinities between users and advertisements and/or advertisement types), prior conversations, discussions, and/or engagements of the user, prior locations of the user (e.g., places that the user has visited, performances/shows/conferences that the user has attended, etc., which may be determined based on historical location (e.g., global positioning system (GPS)) data, based on Exchangeable image file (Exif) data from photos previously captured by a camera of the user's smartphone, based on historical calendar data, etc.), and/or the like.

In some embodiments, the user profile data may additionally, or alternatively, include Interactive Advertising Bureau (IAB)-related data, tag data, genre data, embedding data, and/or the like. In certain embodiments, the user profile data may additionally, or alternatively, include social profile information associated with the user (e.g., the user's social media/networking profile) and/or data regarding actions, preferences, activities, and/or the like relating to the user, the user's friends, the user's family members, or others, such as other users that the user may be following on social media, other users that are in the same field of employment as the user, other users that have the same types of interests as the user, etc. In various embodiments, the immersion evaluation platform 202 may be configured to translate any user profile data that is in the 2D digital domain (e.g., historical web-based data, preference data, etc.) into object affinity in XR (e.g., immersive environment attributes, numerical features, and/or the like).

In one or more embodiments, the user profile data may additionally, or alternatively, include XR domain data, such as data relating to user behavior in immersive environments (e.g., user activities or interactions associated with meta-verse objects, including objects that may be native to an immersive environment and other objects that may be separately embedded in the immersive environment). User behavior data in the XR domain may include information identifying user gazes at one or more objects, how long the user typically gazes at object(s), how close the user typically is to object(s) during gazing, whether the user tends to touch object(s), how long the user typically interacts with object(s), whether the user has exhibited any expressions (e.g., vocal utterances) at or near certain object(s), whether the user has immediately turned away from any object after coming upon the object, whether the user has ever ended a session in an immersive environment after coming upon an object, whether the user prefers interacting with certain types or classes of objects, whether the user prefers lingering at a certain location or in a certain area within an immersive environment, mobility of the user in an immersive environment (e.g., walking or running often in immersive environments), a status of a user's completion of a goal in an immersive environment (e.g., completion of a task, winning a game, etc.), and/or the like.

In various embodiments, the immersion evaluation platform 202 can perform domain adaptation by mapping updated data relating to user behavior and/or interactions in an immersive environment and/or other data relating to user activities and/or interactions in the immersive environment, as input parameters (in the XR domain), to corresponding user profile data, as output parameters (in the 2D digital domain). In one or more embodiments, output parameters can include numerical values, mathematical vectors, and/or the like that represent affinity (e.g., an affinity between a user and an advertisement object, an affinity between a user and an object in the immersive environment, and/or the like). In certain embodiments, mapping the data from the XR domain to the 2D digital domain can include building, or otherwise compiling, an XR behavior data set, in user profile data, for a user based on the user's chosen navigational paths in XR, the user's manner of movement (e.g., gait or the like) in XR, object interactions in XR, and/or the like.

In some embodiments, the data regarding the location of the user may include GPS coordinates or the like provided by one or more of the target device(s) 206, such as a smartphone or a smartwatch of the user. In certain embodiments, the data regarding the location of the user may be based on facial recognition and/or detection data provided by one or more of the target device(s) 206, such as a camera system (e.g., an Internet-of-Things (IoT) camera or the like) positioned at a known location. In one or more embodiments, data regarding the location of the user may include information relating to a communication session (e.g., a Wi-Fi connection, a Bluetooth connection, a near field communication (NFC) connection, and/or the like) established between a network/device (e.g., registered with or otherwise known to the immersion evaluation platform 202 or the immersion engine 204) and one or more of the target device(s) 206, such as a smartphone or a smartwatch of the user.

In one or more embodiments, the data regarding user inputs may include information relating to any utterances or voice-based commands provided by the user, any gesture-based inputs provided by the user (e.g., movements of the user's body, such as the user's legs, arms, hands, fingers, head, eyes, etc.), and/or the like.

In various embodiments, the immersion evaluation platform 202 may determine a likely mood of the user based on some or all of the contextual information (e.g., the current time of day, weather data, genre of music that the user is currently consuming, the user's voice-based inputs, the user's gesture-based inputs, etc.). For example, the immersion evaluation platform 202 may determine whether the user is feeling neutral, jolly, agitated, nervous, etc. based on voice-based inputs, such as utterances made by the user in a neutral manner, a jolly manner, an agitated manner, a nervous manner, etc. and/or based on gesture-based inputs, such as the user assuming a neutral bodily pose, throwing the user's arms up, walking slowly or hurriedly, etc. As another example, the immersion evaluation platform 202 may determine that the user is likely hungry if the current time is shortly (e.g., within a threshold time) before lunchtime (e.g., noon).

In one or more embodiments, the contextual information may additionally, or alternatively, include data regarding the target device(s) 206 employed by the user. This data may identify the specifications or capabilities of the target device(s) 206, such as their processing capabilities, memory capacity, graphics rendering capabilities, network communications capabilities, etc.

As shown by reference number 222, the immersion evaluation platform 202 may obtain data regarding a metaverse object. In exemplary embodiments, the data regarding the metaverse object may include some or all of the usage information/statistics described above. For instance, the data regarding the metaverse object may include requirements and/or objectives specified by a creator or provider of the metaverse object, data regarding the devices and/or networks associated with the users that have previously engaged with the metaverse object, statistics on the various user interactions with the metaverse object, system-based aggregate reviews of the metaverse object (e.g., those generated by the immersion evaluation platform 202 or by other system(s)), and/or the like.

As shown by reference number 224, the immersion evaluation platform 202 may determine the relevance of the metaverse object to the user based on the contextual information and/or the data regarding the metaverse object. In various embodiments, the immersion evaluation platform 202 may perform modeling (e.g., using machine learning model(s) (such as long short-term memory (LSTM) network(s), recursive attention model(s), or the like), embedding/understanding model(s), aggregate model(s), and/or the like) to predict the affinity between the user and the metaverse object or meta context by matching or determining relative similarities between various elements of information regarding the user, other users, the immersive environment involved, the metaverse object, prior reviews of the metaverse object, and/or the like. In certain embodiments, the immersion evaluation platform 202 may perform the modeling based on co-occurrence determination(s), affinity determination(s), and/or database/knowledge graphing.

In some embodiments, the immersion evaluation platform 202 may characterize the relevance between the user and the metaverse object using an affinity or recommendation score. An affinity score may include one or more numerical values, mathematical vectors, and/or the like that represent affinity, and can serve as a construct for deriving recommendations or reviews of metaverse objects for a user. A high affinity score, for instance, can represent a high propensity of a user to interact with, engage with, or otherwise favorably receive, a metaverse object. In various embodiments, a determination of affinity between the user and the metaverse object may be based on a comparison of an affinity score to an affinity threshold (e.g., where an affinity score that is greater than or equal to the affinity threshold may indicate an affinity between the user and the metaverse object).

In one or more embodiments, the immersion evaluation platform 202 may determine and/or adjust affinity scores associated with metaverse objects based on the user's historical activities or behavior (e.g., historical interactions with metaverse objects, historical interests, etc.), current user behavior in an immersive environment, immersive environment characteristics (e.g., content, context, etc.), changes in user activities or behavior over time, and/or the like. It is to be appreciated and understood that the immersion evaluation platform 202 can define affinity scores for relationships between any of the foregoing items and/or any other items. For example, an affinity score can represent a relationship between a user and a metaverse object, a relationship between a user and a class of metaverse objects in general, a relationship between a user and all metaverse objects in general, a relationship between a user and one or more metaverse objects over a period of time, a relationship between a user and an immersive environment, a relationship between a user and a particular content type, a relationship between a user and one or more other users, and so on.

In some embodiments, the immersion evaluation platform 202 may place different emphases on, or associate different weights with, historical user behavior/interests depending on the recency of such behavior, and determine the relevance of the metaverse object to the user based on the weights. For example, the immersion evaluation platform 202 may associate a higher weight with recent data (e.g., in the past few minutes, in the past few days, etc.) relating to a particular user behavior with respect to a certain type of object, associate a lower weight with prior data (e.g., months ago, years ago, etc.) relating to the same or similar user behavior, and determine the relevance of the metaverse object to the user using the recent data and not the prior data (or using the prior data to a lesser extent than the recent data). As another example, the immersion evaluation platform 202 may associate a higher weight with data, relating to a particular user behavior with respect to a certain type of metaverse object, that spans a longer time period (e.g., over the past 5 years, 10 years, etc.) than with recent data (e.g., just a few seconds ago, just a few minutes ago, etc.) relating to the same or similar user behavior, and determine the relevance of the metaverse object to the user using the data spanning the longer time period and not the recent data (or using the recent data to a lesser extent than the data spanning the longer time period).

In various embodiments, the immersion evaluation platform 202 may determine the relevance of the metaverse object to the user based on short-term interests of the user and/or long-term interests of the user. Short-term interests may include interests relating to a current immersive experience or session (or the past several immersive experiences or sessions, such as the past two or three immersive experiences or sessions) and/or may include interests identified in recently-updated user profile data (e.g., over the past hour, past day, past week, and so on). Long-term interests may include interests that have been tracked for the user in relation to numerous immersive experiences or sessions over an extended period of time (e.g., over the past few weeks, past few months, past few years, etc.) and/or may include interests identified in user profile data spanning that extended period of time. In certain embodiments, interests may relate to a given metaverse object (e.g., the metaverse object as a whole or select aspects or features of the object), certain types of metaverse objects, certain types of outputs provided by certain metaverse objects (e.g., a game that issues monetary rewards in the form of cryptocurrency), general interests (e.g., in entertainment, sports, employment, and so on), etc.

In one or more embodiments, the immersion evaluation platform 202 may determine the relevance of the metaverse object based on a determined interest or intent of the user. For instance, the immersion evaluation platform 202 may identify a likely interest or intent of the user based on the user's explicit expressions (e.g., an explicit utterance that a virtual doll is 'cute,' that a virtual car is 'cool,' that the user is hungry, etc.), based on the user's profile data, based on the user's behavior in the immersive environment (e.g., walking to specific rooms in the immersive environment and not to other rooms, engaging with metaverse objects of certain colors or shapes, but not those having other colors or shapes, etc.), based on the user's inputs to the metaverse object (e.g., petting a virtual doll, turning a wheel, staring at a product, etc.), based on outputs or results provided by the metaverse object (e.g., playback of a media clip in a video format and not in an audio format or vice versa, issuance of a financial reward to the user in the form of cryptocurrency and not in a different form such as a cash or vice versa, etc.), based on the user's arrival to a destination (e.g., as a visitor to a city, etc.) and/or the like. As an example, where the immersion evaluation platform 202 identifies that the user intends to obtain a certain type of output (e.g., cryptocurrency rewards) from interactions with metaverse objects, but that, according to the data regarding the current metaverse object, the metaverse object does not provide the desired type of output (e.g., does not provide cryptocurrency rewards), the immersion evaluation platform 202 may determine the metaverse object to be irrelevant (or less relevant) to the user.

In one or more embodiments, the immersion evaluation platform 202 may additionally, or alternatively, determine the relevance of the metaverse object to the user based on external transactions associated with the user. For instance, where the immersion evaluation platform 202 identifies, based on the user's historical location/transactions data, calendar data, or other data, that the user has just purchased and eaten dinner, the immersion evaluation platform 202 may determine an immersive dessert-related object to be relevant to the user. As another example, where the immersion evaluation platform 202 identifies, based on the user's profile data or historical interactions in immersive environments, that the user enjoys occasional gambling, the immersion evaluation platform 202 may determine an immersive casino-related object to be relevant to the user.

In various embodiments, the immersion evaluation platform 202 may additionally, or alternatively, determine the relevance of the metaverse object to the user based on a current time of day. For instance, where the immersion evaluation platform 202 identifies, based on metaverse object usage information and the user's location, that the user is visiting a new area, is near an immersive landmark object, and that other users tend to engage with the object at the current time of day, the immersion evaluation platform 202 may determine the immersive landmark object to be relevant to the user.

In some embodiments, the immersion evaluation platform 202 may additionally, or alternatively, determine the relevance of the metaverse object to the user based on historical or prior user reviews of the metaverse object, such as feedback or scores provided by prior users that have previously interacted with the metaverse object. For instance, where the immersion evaluation platform 202 identifies that the user intends to pet virtual dolls, and where the immersion evaluation platform 202 determines, based on an analysis (e.g., via image/text recognition techniques or the like) of the prior user reviews of the metaverse object, that one or more of those prior user reviews indicate that the metaverse object reacts to petting, the immersion evaluation platform 202 may determine the metaverse object to be relevant to the user.

In various embodiments, the immersion evaluation platform 202 may additionally, or alternatively, determine the relevance of the metaverse object to the user based on prior interactions with the metaverse object by one or more other users (e.g., friends of the user, family members of the user, the user's cohorts, etc.). In one or more embodiments, the immersion evaluation platform 202 may additionally, or alternatively, determine the relevance of the metaverse object to the user based on aggregated historical activities or behavior associated with the user's social contacts—e.g., tendencies or frequencies of the social contact(s) to interact with other like metaverse objects (e.g., of the same or a similar class or type, of the same size, shape, or color, and so on). In various embodiments, the immersion evaluation platform 202 may additionally, or alternatively, determine the relevance of the metaverse object to the user based on a determined similarity of the metaverse object with one or more other objects that the user (and/or social contact(s) associated with the user) has previously interacted with. As an example, in a case where the immersion evaluation platform 202 determines that the metaverse object belongs to the same or a similar class as that of one or more other metaverse objects with which the user has (or the user's cohorts have) previously engaged (e.g., food-related immersions), the immersion evaluation platform 202 may determine the metaverse object to be relevant to the user.

As shown by reference number 226, the immersion evaluation platform 202 may generate and provide a personalized recommendation or review of the metaverse object based on the determined relevance and/or other object-related information. In various embodiments, the immersion evaluation platform 202 may perform modeling to generate the personalized recommendation or review (e.g., using machine learning model(s) (such as LSTM network(s), recursive attention model(s), or the like), embedding/understanding model(s), aggregate model(s), and/or the like).

In exemplary embodiments, the immersion evaluation platform 202 may decide on whether to generate a personalized recommendation or review of the metaverse object based the determined relevance. In one or more embodiments, where the immersion evaluation platform 202 characterizes the determined relevance in the form of one or more scores, the immersion evaluation platform 202 may decide on whether to generate a personalized recommendation or review of the metaverse object based on comparison(s) of the score(s) with one or more thresholds. For instance, the immersion evaluation platform 202 may determine to generate a personalized recommendation or review of the metaverse object if a determined relevance score satisfies (e.g., is greater than or equal to) a threshold, and may refrain from generating a personalized recommendation or review of the metaverse object if the determined relevance score does not satisfy the threshold.

In exemplary embodiments, the immersion evaluation platform 202 may additionally, or alternatively, decide on whether to generate a personalized recommendation or review of the metaverse object based on other object-related information. In one or more embodiments, this object-related information may relate to prior user reviews/scores of the metaverse object, one or more elements of data included in the aforementioned usage information associated with the metaverse object, and/or the like.

As an example, in a case where the immersion evaluation platform 202 identifies, from usage information associated with the metaverse object, that prior users (e.g., some of the prior users, a threshold number of the prior users, or all of the prior users) who have previously engaged with the metaverse object experienced a system or network issue (e.g., average latency was greater than a certain latency threshold, object rendering was degraded, etc.), the immersion evaluation platform 202 may decide to refrain from generating a personalized recommendation or review of the metaverse object for the user.

As another example, in a case where the immersion evaluation platform 202 identifies, from usage information associated with the metaverse object, that prior users (e.g., some of the prior users, a threshold number of the prior users, or all of the prior users) who have previously engaged with the metaverse object and experienced a system or network issue (e.g., average latency was greater than a certain latency threshold, object rendering was degraded, etc.) were using target device(s) that had insufficient capabilities relative to (e.g., capabilities that did not meet) the device, compute, rendering, or network requirements associated with the metaverse object, and where the immersion evaluation platform 202 identifies, based on data regarding the specifications or capabilities of the target device(s) 206 and/or relevant network bandwidth/speed, that the user's target device(s) 206 have sufficient capabilities and/or that the user's network bandwidth/speed is sufficient relative to the device, compute, rendering, network requirements associated with the metaverse object, the immersion evaluation platform 202 may decide to generate a personalized recommendation or review of the metaverse object for the user.

As yet another example, in a case where the immersion evaluation platform 202 identifies, from usage information associated with the metaverse object, that prior users (e.g., some of the prior users, a threshold number of the prior users, or all of the prior users) who have previously engaged with the metaverse object experienced a system or network issue (e.g., average latency was greater than a certain latency threshold, object rendering was degraded, etc.), but that, based on prior user review data for the metaverse object, those users actually rated their experiences favorably (e.g., average ratings actually exceeded a threshold value), the immersion evaluation platform 202 may decide to generate a personalized recommendation or review of the metaverse object for the user.

Different types of data, such as video data, voice data, image data, and text data, may be associated with different throughputs levels that dictate different maximum acceptable latencies (e.g., a certain high latency may not be acceptable for video data transmissions, but may be acceptable for text-based transmissions). Thus, in various embodiments, the immersion evaluation platform 202 may differentiate certain performance parameters, such as latency, throughput, or the like based on the data types associated with the metaverse object, and may take these differentiations into consideration when deciding on whether to generate a personalized recommendation or review.

It is to be appreciated and understood that the immersion evaluation platform 202 may, as part of deciding whether to generate a personalized recommendation or review of the metaverse object for the user, consider one or more of numerous possibilities or permutations of data items from prior user reviews/scores and usage information associated with the metaverse object, and thus the various example implementations presented herein are merely exemplary.

In certain embodiments, the immersion evaluation platform 202 may, despite identifying potential issue(s) (e.g., a possible latency issue, a possible object rendering issue, etc.) that the user may experience if the user were to engage with the metaverse object, nevertheless decide to generate a personalized recommendation or review of the metaverse object for the user. In these embodiments, the immersion evaluation platform 202 may include, in the personalized recommendation or review, a notification that flags the potential issue(s) to the user. This can provide an opportunity for the user to either attempt to engage with the metaverse object, forgo the experience altogether, or otherwise address the issue(s), such as by upgrading the user's target device(s) 206 or seeking access to a faster or more stable network.

It is to be appreciated and understood that various determinations made by the immersion evaluation platform 202 as part of identifying the relevance of the metaverse object to the user may similarly be made or repeated as part of deciding whether to generate a personalized recommendation or review of the metaverse object. For instance, in the example described above with respect to step 224 where the immersion evaluation platform 202 identifies that the user intends to obtain a certain type of output (e.g., cryptocurrency rewards) from interactions with metaverse objects and determines that the metaverse object does not provide the desired type of output (e.g., does not provide cryptocurrency rewards), the immersion evaluation platform 202 may, in a modified example, nevertheless determine the metaverse object to be relevant to the user (e.g., for other reasons, such as the metaverse object being relevant to a topic that the user is researching). In this modified example, the immersion evaluation platform 202 may, as part of step 226, either decide to generate a personalized recommendation or review of the metaverse object, or refrain from doing so, based on a comparison of the user's desired outputs with the possible outputs of the metaverse object and/or based on evaluations of other information.

In various embodiments, the immersion evaluation platform 202 may include various items of information in a personalized recommendation or review of the metaverse object for the user. Some example personalized recommendations or reviews of metaverse objects are described below with respect to FIG. 2C. In exemplary embodiments, the immersion evaluation platform 202 may provide the personalized recommendation or review in summary form with information that richly describes the inputs (or input state) used to generate the personalized recommendation or review, such as how the personalized recommendation or review was derived or obtained. In certain embodiments, the immersion evaluation platform 202 may include adaptations of an aggregate of some or all of the prior user reviews of the metaverse object (e.g., average ratings or scores from the prior user review(s), summarizations of certain comments in those prior user review(s), etc.).

In one or more embodiments, the immersion evaluation platform 202 may additionally, or alternatively, include some or all of the usage information associated with the metaverse object (e.g., object requirements/specifications, data regarding permissible object inputs, data regarding possible object outputs, data regarding total/average object engagement time for one or more users, data regarding total/average number of return visits to the metaverse object by one or more users, user biometric data, data regarding the contexts of users that have previously engaged with the metaverse object, data regarding the actual user inputs that were provided to the metaverse object during the user engagements, data regarding corresponding outputs there were provided by the metaverse object as part of those engagements, data regarding the throughputs relating to the user engagements with the metaverse object, data regarding the network latencies experienced by users during the engagements, data regarding the specifications or capabilities of the devices (relating to processing, memory, graphics, etc.) employed by the users for the engagements, data regarding interactions with the metaverse object by the user's social contacts or cohorts, and/or the like). For instance, including information regarding the object requirements/specifications, data regarding the throughputs relating to prior user engagements with the metaverse object, data regarding the network latencies experienced by users during these prior engagements, data regarding the specifications or capabilities of the devices employed by the users for the prior engagements, etc., can alert the user to any prerequisites for (or what to expect when) engaging with the metaverse object. Further, including information regarding the engagement metrics, data regarding total/average number of return visits to the metaverse object by one or more users, user biometric data, data regarding the contexts of users that have previously engaged with the metaverse object, and so on can disambiguate actual user experiences with the metaverse object.

In this way, rather than merely showing a typical user-provided review, which may be highly subjective and irrelevant to a target user, the immersion evaluation platform 202 may present recommendations or reviews in a manner that enables a target user to identify the interactions that prior user(s) actually experienced with the metaverse object. For instance, instead of simply showing a vague user comment, such as "this is for newbies," the immersion evaluation platform 202 may provide a personalized recommendation or review that identifies or presents a visceral reaction from biometrics or actual object interactions in the virtual space.

In various embodiments, the immersion evaluation platform 202 may determine the content or items to include in a personalized recommendation or review of the metaverse object for the user, how to format the content or items in the personalized recommendation or review of the metaverse object, and/or how to select a prior user review set (or how to modify or select sub-items from the prior user reviews) to utilize in the personalized recommendation or review of the metaverse object based on one or more of a variety of different evaluations of some or all of the contextual information, some or all of the usage information associated with the metaverse object, and/or portions of some or all of the prior user reviews of the metaverse object.

As discussed above, since different users may interact with a given metaverse object in different ways, reviews provided by a particular user and usage of a metaverse object by that particular user may be subjective and thus irrelevant for other users. In one or more embodiments, the immersion evaluation platform 202 may, when generating a personalized recommendation or review of a metaverse object for a given target user, characterize or categorize (e.g., in a hierarchical fashion or otherwise) the factors that are useful for generating the personalized recommendation or review (including subjective user reviews and/or user-provided scores for the object), and utilize the characterization to generate the personalized recommendation or review. For instance, where there is a match between some but not all conditions associated with the target user and prior user(s) who have previously interacted with a metaverse object (e.g., the contexts of the users may be different, the inputs to the object may be different for the various users, or the outputs by the object for the various users may be different), the immersion evaluation platform 202 may, rather than suppress possibly irrelevant prior user reviews, identify aspects of prior user reviews or associated experiences that are similar to those of the target user, and group/summarize the prior user reviews according to those aspects. As some examples, the immersion evaluation platform 202 may determine a prior user review for an object or prior usage of the object by a prior user to be relevant to a current target user based on similar latency data (e.g., a latency experienced by the prior user being within a threshold difference from a latency associated with the current target user), similar biometric data (e.g., breathing rate experienced by the prior user being within a threshold difference from a breathing rate associated with the current target user), and or the like, and may utilize one of more of these grouped similarities to decide on or to derive a personalized recommendation or review of the object for the target user.

As another example, in a case where the immersion evaluation platform 202 identifies, based on an evaluation of the contextual information and/or the usage information associated with the metaverse object, that most of the prior users who have previously interacted with the object (e.g., a threshold number of the prior users) were interested in being entertained by the metaverse object, achieving a goal with the metaverse object (e.g., obtaining a workout), or playing with a certain feature of the metaverse object, etc., the immersion evaluation platform 202 may include an indication regarding that interest in the personalized recommendation or review of the metaverse object for the user.

As yet another example, the immersion evaluation platform 202 may identify repeated visits to the metaverse object as an indication of positive exposure to the metaverse object, and factor this finding in its generation of the personalized recommendation or review of the metaverse object for the user. Continuing the example, in a case where immersion evaluation platform 202, identifies, based on the usage information associated with the metaverse object, that numerous prior users (e.g., some of the prior users, a threshold number of the prior users, or all of the prior users) have re-engaged with the metaverse object (e.g., have revisited the metaverse object more than a threshold number of times), the immersion evaluation platform 202 may provide an indication of this in the personalized recommendation or review of the metaverse object for the user.

As a further example, the immersion evaluation platform 202 may differentiate user contexts or intents associated with user interactions with the metaverse object (e.g., by comparing and/or rating the different contexts/intents), and factor the differentiation in its generation of the personalized recommendation or review of the metaverse object for the user. Continuing the example, in a case where the immersion evaluation platform 202 identifies, based on the contextual information and the usage information associated with the metaverse object, that the user is interested in conducting research for a paper, the immersion evaluation platform 202 may or may not utilize (e.g., any) information from prior reviews provided by prior users who merely sought to be entertained by the object.

As yet another example, in a case where the immersion evaluation platform 202 identifies, based on an evaluation of the usage information associated with the metaverse object and based on evaluating one or more prior user reviews of the metaverse object, that gesture- and voice-based interactions with the metaverse object are possible, but where prior users who have previously interacted with the metaverse object via voice provided higher ratings of the metaverse object, the immersion evaluation platform 202 may include an indication regarding this finding in the personalized recommendation of review of the metaverse object for the user.

As a further example, in a case where the immersion evaluation platform 202 identifies, based on an evaluation of the usage information associated with the metaverse object, such as user biometric data or data regarding user inputs corresponding to prior users who have previously engaged with the metaverse object, that the engagements with the metaverse object tended to have certain user effects (e.g., tended to increase user heart rate, tended to uplift user mood, and/or the like), the immersion evaluation platform 202 may identify these potential effects in the personalized recommendation or review of the metaverse for the user.

As another example, in a case where the immersion evaluation platform 202 identifies, based on an evaluation of prior user reviews and/or the usage information associated with the metaverse object, prior interactions with the metaverse object by the user's social contacts or cohorts, the immersion evaluation platform 202 may include, in the personalized recommendation or review of the metaverse object for the user, information regarding those interactions and/or information concerning the rating(s) or feedback provided in those prior user reviews (e.g., "four of your friends endorsed this experience" or the like).

As yet another example, in a case where the immersion evaluation platform 202 identifies, based on an evaluation of the user profile data, that the user prefers content in a particular language, the immersion evaluation platform 202 may format or provide the content of the personalized recommendation or review of the metaverse object in the particular language and/or translate any content extracted from prior user reviews of the metaverse object (and that is to be included in the personalized recommendation or review) to the particular language.

As a further example, in a case where the immersion evaluation platform 202 identifies, based on an evaluation of the usage information associated with the metaverse object, that the metaverse object is applicable to different usage scenarios or locations (e.g., a virtual shirt may be an item in the user's virtual closet or may be for sale in a virtual store), the immersion evaluation platform 202 may determine the particular information to include in the personalized recommendation or review of the metaverse object for the user based on the appropriate usage scenario. Continuing this example, where the immersion evaluation platform 202 determines that the metaverse object is for sale in a virtual store and will require a purchase transaction to be conducted over a network if the user desires to obtain the metaverse object, and where the immersion evaluation platform 202 determines, based on the contextual information, that the user's device/network connectivity is poor (e.g., satisfies one or more thresholds), the immersion evaluation platform 202 may include, in the personalized recommendation or review of the metaverse object for the user, a warning or alert regarding the potential device/network connectivity issue. Further continuing the example, the immersion evaluation platform 202 may or may not include such a warning if the immersion evaluation platform 202 otherwise determines that the metaverse object already exists in the user's virtual closet.

As another example, the immersion evaluation platform 202 may tailor what is included in a personalized recommendation or review of the metaverse object based on a determined current interest of the user, such as any particular features of the metaverse object that the user is gazing at or is interacting with (e.g., a sub-object, a visual feature, an audio feature, how a related "application" was initiated/executed, etc.). Continuing the example, in a case where the metaverse object includes a sub-object (e.g., a smartwatch worn by a virtual character), where the immersion evaluation platform 202 identifies, based on an evaluation of data relating to user activities and/or interactions within an immersive environment, that the user is gazing not at the metaverse object in general but at the sub-object (e.g., the smartwatch), the immersion evaluation platform 202 may retrieve any prior user reviews associated with the sub-object and include, in the personalized recommendation or review of the metaverse object, content derived from those prior user reviews. Further continuing the example, the immersion evaluation platform 202 may include such content lieu of or in addition to any content that may be derived from other prior user reviews that are directed to the metaverse object (e.g., the virtual character) in general.

As yet another example, the immersion evaluation platform 202 may filter prior user reviews of the metaverse object based on determined inputs and/or outputs that the user prefers. Continuing the example, in a case where the immersion evaluation platform 202 identifies, based on an evaluation of the contextual information, that the user prefers to spin or twirl metaverse objects and/or prefers to hear virtual characters sing, the immersion evaluation platform 202 may include, in the personalized recommendation or review of the metaverse object for the user, information regarding whether such inputs and/or outputs are possible with the metaverse object, any aggregate data derived from prior user reviews concerning such inputs and/or outputs, and/or the like.

As a further example, the immersion evaluation platform 202 may modify one or more prior user reviews or aggregations thereof to tailor the personalized recommendation or review of the metaverse object for the user. For instance, a certain metaverse object, such as a virtual doll, may have received good reviews (e.g., a high average score of '4.5' on a scale of 1 to 5) from prior users that have previously interacted with the object in a first way (e.g., by petting the virtual doll) and poor reviews (e.g., a low average score of '1.2') from prior users that have previously interacted with the object in a different manner (e.g., by speaking to the virtual doll). In this example, the immersion evaluation platform 202 may, based upon a first determination that the user is interested in petting virtual objects, include a suggestion in the personalized recommendation or review to do so, and may, based upon a second determination that the user is interested in speaking to objects, either identify the poor user reviews of the object in the personalized recommendation or review, or alternatively, not generate or present any recommendation or review of the metaverse object for the user at all.

As another example, in a case where the immersion evaluation platform 202 identifies, based upon an evaluation of the usage information associated with the metaverse object, that one or more prior users caused the metaverse object to be presented into a different manner (e.g., from a default shape, color, size, etc. to a different shape, color, size, from a default playback frame rate to a different playback frame rate, etc.) (or caused content associated with the metaverse object to be translated from a default language to a different language) as part of engaging with the metaverse object, the immersion evaluation platform 202 may include information regarding the format/language change in the personalized recommendation or review of the metaverse object for the user. Continuing the example, where the immersion evaluation platform 202 further identifies, based upon an evaluation of the usage information associated with the metaverse object, that a performance associated with the metaverse object became degraded as a result of the format/language change, the immersion evaluation platform 202 may further include an indication regarding this issue in the personalized recommendation or review of the metaverse object to forewarn the user of potential limitations.

In exemplary embodiments, the immersion evaluation platform 202 may derive, or otherwise determine, embedding data, such as vector information and/or the like concerning recommendation or review object(s) to be embedded (e.g., by the immersion engine 204) within an immersive environment. In various embodiments, the embedding data can specify the parameters of a recommendation or review object for embedding into an immersive environment, across multiple modalities, such as audio objects, video objects, three-dimensional objects, text-based objects, etc. In some embodiments, the immersion evaluation platform 202 can generate, create, or otherwise adapt from a model (e.g., an aggregate model represented by vectors), embedding features for presenting the personalized recommendation or review object(s) within the immersive environment.

In various embodiments, the immersion evaluation platform 202 may, based on data relating to the immersive environment, identify candidate regions within the immersive environment for placement of a generated recommendation or review. For example, in a case where the immersion evaluation platform 202 has access to information regarding available surfaces of the immersive environment for placement of a generated recommendation or review, the immersion evaluation platform 202 can, based on such information, derive embedding data that specifies placement of the personalized recommendation or review on a particular surface of the immersive environment and proximate to (e.g., within a threshold distance from) the subject metaverse object within the immersive environment.

In this way, the immersion evaluation platform 202 may leverage engagement metrics, passive features, user cohort activities, contextual scenarios, and/or various other information to decide on whether to recommend or review the metaverse object, what data to include in a personalized recommendation or review of the metaverse object, and how to present the personalized recommendation or review to the user. Through selective filtering of which metaverse objects to present recommendations or reviews for, the immersion evaluation platform 202 may steer the user to metaverse objects that are most likely to be of interest to the user, and permit increased throughput for those object(s).

As shown by reference number 228, the immersion evaluation platform 202 may receive user feedback relating to the metaverse object and/or the personalized recommendation or review of the metaverse object. The user feedback may be voice-based, text-based, gesture-based, etc., and may identify the effectiveness, usefulness, and/or accuracy of the personalized recommendation or review and/or provide additional context regarding the user's experience with the metaverse object.

In one or more embodiments, the immersion evaluation platform 202 may cause (e.g., via an instruction to the immersion engine 204) one or more of the target device(s) 206 to present a user interface (UI) to obtain the user feedback. The UI may include one or more user selectable options for rating (e.g., scoring, approving, disapproving, or the like) or commenting on the various components or elements of information in the personalized recommendation or review and/or the user's experience with the metaverse object (e.g., the personalized recommendation or review "is irrelevant to me," the metaverse search bot object is useful for searching for "music" but not for "lodging," etc.).

In various embodiments, the immersion evaluation platform 202 may additionally, or alternatively, include or embed, in the personalized recommendation or review object, one or more user selectable options for the rating and/or commenting. In these embodiments, the immersion evaluation platform 202 may obtain the user feedback based on the user's interactions with the personalized recommendation or review object in the immersive environment.

In certain embodiments, the user's interactions in the immersive environment or with the metaverse object may serve as objective feedback on the metaverse object and/or the personalized recommendation or review. That is, detection of a visceral reaction from biometrics or actual object interactions in the virtual space, for instance, may indicate whether the user found the user's experience with the metaverse object favorable and/or found the personalized recommendation or review meaningful or helpful. For instance, in a case where immersion evaluation platform 202 detects, based on information regarding the user's interactions in the immersive environment, that the user showed interest in the personalized recommendation or review (e.g., that the user gazed at the personalized recommendation or review object for longer than a threshold period of time, that the user dwelled near the personalized recommendation or review for longer than the threshold period of time, that the user touched the personalized recommendation or review object, and/or the like) or ignored the personalized recommendation or review object (e.g., that the user turned away from the personalized recommendation or review object within a threshold period of time after observing the personalized recommendation or review object, or the like), the immersion evaluation platform 202 can utilize such information in subsequent actions of the immersion evaluation platform 202 to provide improved or optimal personalized recommendations or reviews for the user. As an example, in a case where the personalized recommendation or review included a warning of network latency that the user will likely experience if the user were to engage with the metaverse object, subsequent detection of the user moving away from the metaverse object (e.g., without engaging with the metaverse object) may indicate that the user found the personalized recommendation or review meaningful or helpful. As another example, in a case where the personalized recommendation or review indicated that a larger number of the user's social contacts (e.g., ten friends or more) endorsed the metaverse object, subsequent detection of the user turning away from the metaverse object (e.g., without interacting with the metaverse object) may indicate that the user did not find the personalized recommendation or review meaningful or helpful.

In any case, user feedback may help (e.g., the immersion evaluation platform 202) identify if any of the modeling stages associated with the determination of the relevancy of the object to the user and/or the generation of the personalized recommendation or review (e.g., steps 224 and/or 226 of FIG. 2A) were deficient or failed and needs to be improved, or if any item of information in the personalized recommendation or review was unclear or needs to be shown more prominently.

As shown by reference number 230, the immersion evaluation platform 202 may train or update model(s) for determining the relevancy of metaverse objects to the user and/or model(s) for generating personalized recommendations or reviews of metaverse objects for the user. In exemplary embodiments, the immersion evaluation platform 202 may train or update the model(s) (e.g., some or all of the aforementioned machine learning model(s), embedding/understanding model(s), aggregate model(s), and/or the like associated with steps 224 and/or 226) based on the user feedback. In various embodiments, the immersion evaluation platform 202 can provide information regarding the user feedback as input to the model(s), which may perform machine learning to automate future determinations of the relevancy of metaverse objects to the user and/or to automate future generations of personalized recommendations or reviews of metaverse objects for the user. In one example, the user may be associated with more than one target device 206 and the relevance of an immersion may depend on which target device 206 is utilized. Specifically, if a first target device 206 featuring high-bandwidth and high immersion capabilities (e.g., greater than a threshold bandwidth; capabilities greater than certain minimum required capabilities) is used, certain metaverse objects may be recommended. If a second target device 206 lacks those advanced capabilities, the immersion evaluation platform 202 may suppress the recommendations—e.g., recognizing that the user will likely experience a low-quality immersion and therefore a negative experience when interacting with a given metaverse object.

As shown by reference number 232, the immersion evaluation platform 202 may perform one or more subsequent actions. In exemplary embodiments, the immersion evaluation platform 202 may provide feedback data to one or more parties associated with the metaverse object. The parties may include a creator/provider of the metaverse object and users who have previously interacted with the metaverse object. The feedback data may include some or all of the aforementioned user feedback, such as user-based contributions (e.g., comments on the usability, functionality, performance, etc. of the metaverse object) and/or feedback associated with any system-generated recommendations or reviews of the metaverse object.

In some embodiments, the immersion evaluation platform 202 may provide the feedback data in real-time (or near real-time), which can enable the creator/provider of the metaverse object to immediately identify any issues that there might be with the metaverse object's capabilities or functions and/or what is needed to correct these issues in general or for the user in particular.

In certain embodiments, the immersion evaluation platform 202 may include, in the feedback data, information obtained from evaluations of the usage information associated with the metaverse object or other available data, such as the capabilities or specifications of the target devices used by users to engage with the metaverse object, the network parameters (e.g., latency, throughput, etc.) during engagements, etc. Where the creator/provider of the metaverse object determines, from such information, that most users use devices with the latest technologies or have access to fast and stable networks, the creator/provider can decide to enhance or update the metaverse object (e.g., with more graphics content, higher resolution, etc.), which can improve overall user experience.

Feedback data can also inform the creator/provider of the metaverse object on whether there is a need to alert users to potential performance issues if the metaverse object is experienced in unintended manners. For instance, where feedback data identifies poor user reviews of the metaverse object when the metaverse object is translated to a language that is different from a default language or when the metaverse object is rendered by an inferior audio device (e.g., 2 channels instead of 7.2 channels), the creator/provider can opt to include a warning (e.g., by showing a deduction in points or the like) to forewarn users of the potential issue(s). Feedback data can also enable the creator/provider of the metaverse object to define or identify target audiences for its content (such as those users who tend provide higher review scores relative to other "non-primary" users) as well as provide the creator/provider with insight into what's popular or attractive, which can further inspire the creation of higher-quality content. Further, providing feedback data to one or more users who have previously interacted with the metaverse object can re-engage those users in the immersion, which may promote additional user interactions for the immersion and in the overall immersive environment.

In embodiments where the immersion evaluation platform 202 includes, in a personalized recommendation or review of the metaverse object, content/comments from a particular user's prior review of the metaverse object, and where a current user favorably receives the content/comments (e.g., has viewed the content/comments in the personalized recommendation or review, has "liked" the content/comments, etc.), the immersion evaluation platform 202 may (e.g., for subsequent generations of personalized recommendations or reviews for users) associate the particular user's reviews with higher weights as well as notify the particular user of the favorable feedback, which can motivate the particular user to provide more reviews on object engagements. In some embodiments, a user may validate the user's own reviews (e.g., by using a digital signature, emoticon, a non-fungible token (NFT), and/or the like).

In some embodiments, the immersion evaluation platform 202 may cause data regarding the user's interactions with the metaverse object and/or the aforementioned user feedback to be linked or associated with information relating to other metaverse objects that the user has previously interacted with. In one or more embodiments, the immersion evaluation platform 202 may additionally, or alternatively, cause that data to be aggregated (e.g., in one or more review categories) with information relating to other users and their interactions with the metaverse objects or other metaverse objects.

It is to be appreciated and understood that, while the immersion evaluation platform 202 is described above as performing functions relative to a particular metaverse object that the user is engaging with, in various embodiments, the immersion evaluation platform 202 may additionally, or alternatively, be capable of performing the same or similar functions without the user specifically engaging or interacting with a particular metaverse object. For instance, the immersion evaluation platform 202 may be configured to obtain data regarding multiple metaverse objects near the user (e.g., within a threshold physical or virtual distance from the user) while the user is traversing or present in an immersive environment (e.g., similar to step 222 of FIG. 2A), and perform steps 224 and/or 226 for some or all of these metaverse objects. In this way, the immersion evaluation platform 202 may perform real-time (or near real-time) location-based generation of personalized recommendations or reviews of metaverse objects for the user.

In certain embodiments, specific recommendations or reviews may be generated for metaverse objects associated with a geographic location (e.g., a particular city or town that the user is currently located at). In this way, a given metaverse object that may exist in different geographic locations may be recommended or reviewed differently depending on its location.

In some embodiments, batch recommendations or reviews may be generated based on a given context. For instance, where various users are determined to have arrived (e.g., by bus or train) to a certain location for tourist activities, the immersion evaluation platform 202 may "broadcast" recommendations or reviews of relevant metaverse objects to those users (e.g., or their target device(s)) to alert them to nearby attractions or activities.

In various embodiments, the immersion evaluation platform 202 may be capable of leveraging neural rendering (e.g., those that do not have specific appearances or immersions pre-defined), where parameters of the neural rendering may be captured as part of a review of the metaverse object, which can be used to later recreate the immersive experience for the user (or a different user) or to qualify the differences between the user's experience and the experiences of other users. One example of neural rendering technology allows the parametric definition of one or more object attributes (e.g., a funny song about cats that takes place in Austin, Texas), but may defer the exact rendering (audio, visual, etc.) until a later time. Continuing the example, where neural rendering is executed as part of the metaverse object for a child (e.g., a user identified to be below a particular age), a cartoon-stylized cat may be the focus and vocal backups may be sung by well-known educational personalities (e.g., Kermit the Frog and Bruno the orange dinosaur). In another example, where neural rendering is executed as part of the metaverse object for an adult (e.g., a user identified to be above a particular age), an Internet-famous grumpy cat may be the focus and vocal backups may be sung by human-like avatars that represent local sporting mascots (e.g., longhorns, bats, etc.).

Figure 2B:
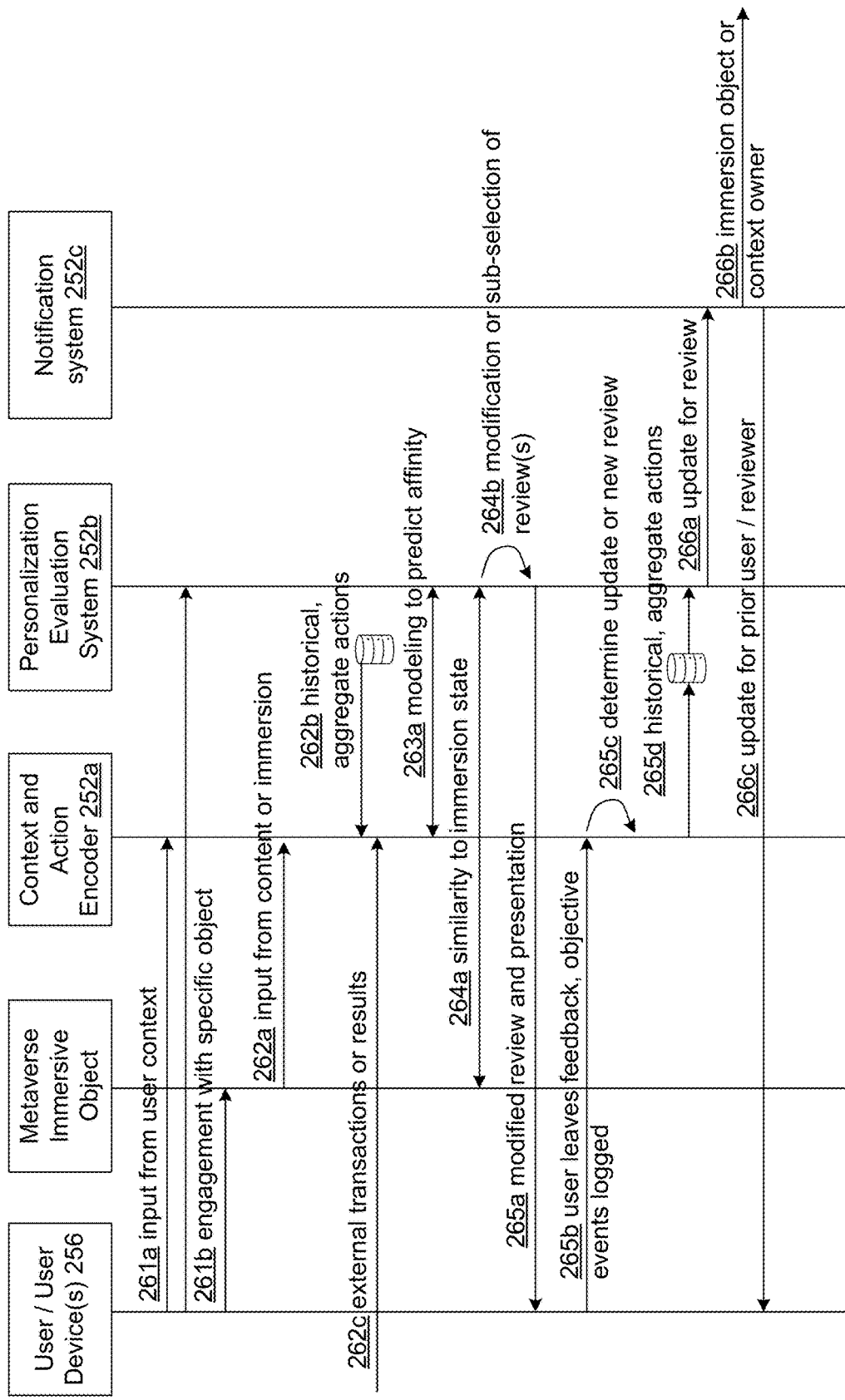
FIG. 2B is a block diagram illustrating an example, non-limiting embodiment of a system functioning within, or operatively overlaid upon, the communications network of FIG. 1 in accordance with various aspects described herein.

FIG. 2B is a block diagram illustrating an example, non-limiting embodiment of a system 250 functioning within, or operatively overlaid upon, the communications network 100 of FIG. 1 in accordance with various aspects described herein.

As depicted in FIG. 2B, the system 250 may include a user/user device(s) 256, a metaverse object, a context and action encoder 252a, a personalization evaluation system 252b, a notification system 252c, and one or more databases. In various embodiments, the system 250 may be similar to the system 200 of FIG. 2A. For example, portions of the system 250 may perform functions similar to those described above with respect to the immersion evaluation platform 202, the immersion engine 204, and/or the target device(s) 206. Such functions may include some or all of the steps 220, 222, 224, 226, 228, 230, and 232 described above with respect to FIG. 2A. In various embodiments, one or more of the context and action encoder 252a, the personalization evaluation system 252b, and the notification system 252c may correspond to portions of the immersion evaluation platform 202 and/or the immersion engine 204 described above with respect to FIG. 2A.

As shown in FIG. 2B, the context and action encoder 252a and/or the personalization evaluation system 252b may (e.g., similar to that described above with respect to the immersion evaluation platform 202 of FIG. 2A) receive inputs from user context (261a) (e.g., regarding the user's location, the user's navigation, related applications/immersions that interact with the metaverse object, etc.), identify engagement(s) of the user with the metaverse object (261b), and obtain input information from the immersion/content (262a) (e.g., device/compute/rendering requirements, usage information associated with the metaverse object or other objects, system-based aggregate reviews of the metaverse object or other objects, etc.). As also shown in FIG. 2B, the context and action encoder 252a may (e.g., similar to that described above with respect to the immersion evaluation platform 202 of FIG. 2A) retrieve historical aggregate data (e.g., data regarding user actions or activities, user profile data, data regarding the user's social contacts or cohorts, such as their interests and/or prior interactions with the metaverse object or other objects, etc.) (262b), detect external transactions or results associated with the user (262c), and coordinate with the personalization evaluation system 252b to perform modeling, based on this information, to predict affinity of the user with the metaverse object or context (263a). In certain embodiments, the modeling may factor in prior user reviews of the metaverse object, a determined intent of the user, the current time of day, the user's historical activities (e.g., over time), and aggregate historical activities of the user's social contacts, cohorts, etc. to enable generation of recommendation scores. As depicted in FIG. 2B, the personalization evaluation system 252b may (e.g., similar to that described above with respect to the immersion evaluation platform 202 of FIG. 2A) perform various evaluations and/or actions relating to the user context, similarities of the current context with prior usage scenarios or contexts (264a), similarities between the object interactions of the user, the user's social contacts, and/or the user's cohorts (264a), and the need to modify (or select portions of) prior user reviews for the user, refrain from generating (e.g., hiding) recommendations or reviews for the user, and/or translate/transform any personalized recommendation or review that is to be generated for the user (264b, 265a).

As also shown in FIG. 2B, the context and action encoder 252a may (e.g., similar to that described above with respect to the immersion evaluation platform 202 of FIG. 2A) obtain user feedback regarding the metaverse object and/or the personalized recommendation or review (265b), determine whether to update the personalized recommendation or review or to generate a new personalized recommendation or review based on the feedback (265c), perform the update/generate the new recommendation or review as needed, and update the database(s) based on the user feedback (265d). Additionally, the personalization evaluation system 252b may (e.g., similar to that described above with respect to the immersion evaluation platform 202 of FIG. 2A) provide the user feedback to the notification system 252c (266a) to forward to a creator or provider of the metaverse object or context. Information regarding updates or changes to the metaverse object or context (e.g., by the creator or provider) may then be transmitted to the user/user device(s) 256 (266c).

It is to be understood and appreciated that the quantity and arrangement of systems, devices, engines, platforms, encoders, and databases shown in FIG. 2A and/or FIG. 2B are provided as an example. In practice, there may be additional systems, devices, engines, platforms, encoders, and/or databases, or differently arranged systems, devices, engines, platforms, encoders, and/or databases than those shown in FIG. 2A and/or FIG. 2B. For example, the system 200 or 250 can include more or fewer systems, devices, engines, platforms, encoders, and/or databases. In practice, therefore, there can be hundreds, thousands, millions, billions, etc. of such systems, devices, engines, platforms, encoders, and/or databases. In this way, example system 200 or 250 can coordinate, or operate in conjunction with, a set of systems, devices, engines, platforms, encoders, and/or databases and/or operate on data sets that cannot be managed manually or objectively by a human actor. Furthermore, two or more systems, devices, engines, platforms, encoders, or databases shown in FIG. 2A and/or FIG. 2B may be implemented within a single system, device, engine, platform, encoder, or database, or a single system, device, engine, platform, encoder, or database shown in FIG. 2A and/or FIG. 2B may be implemented as multiple systems, devices, engines, platforms, encoders, or databases. Additionally, or alternatively, a set of systems, devices, engines, platforms, encoders, and/or databases of the system 200 or 250 may perform one or more functions described as being performed by another set of systems, devices, engines, platforms, encoders, and/or databases of the system 200 or 250.

It is also to be understood and appreciated that, although FIGS. 2A and 2B are described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 2C:
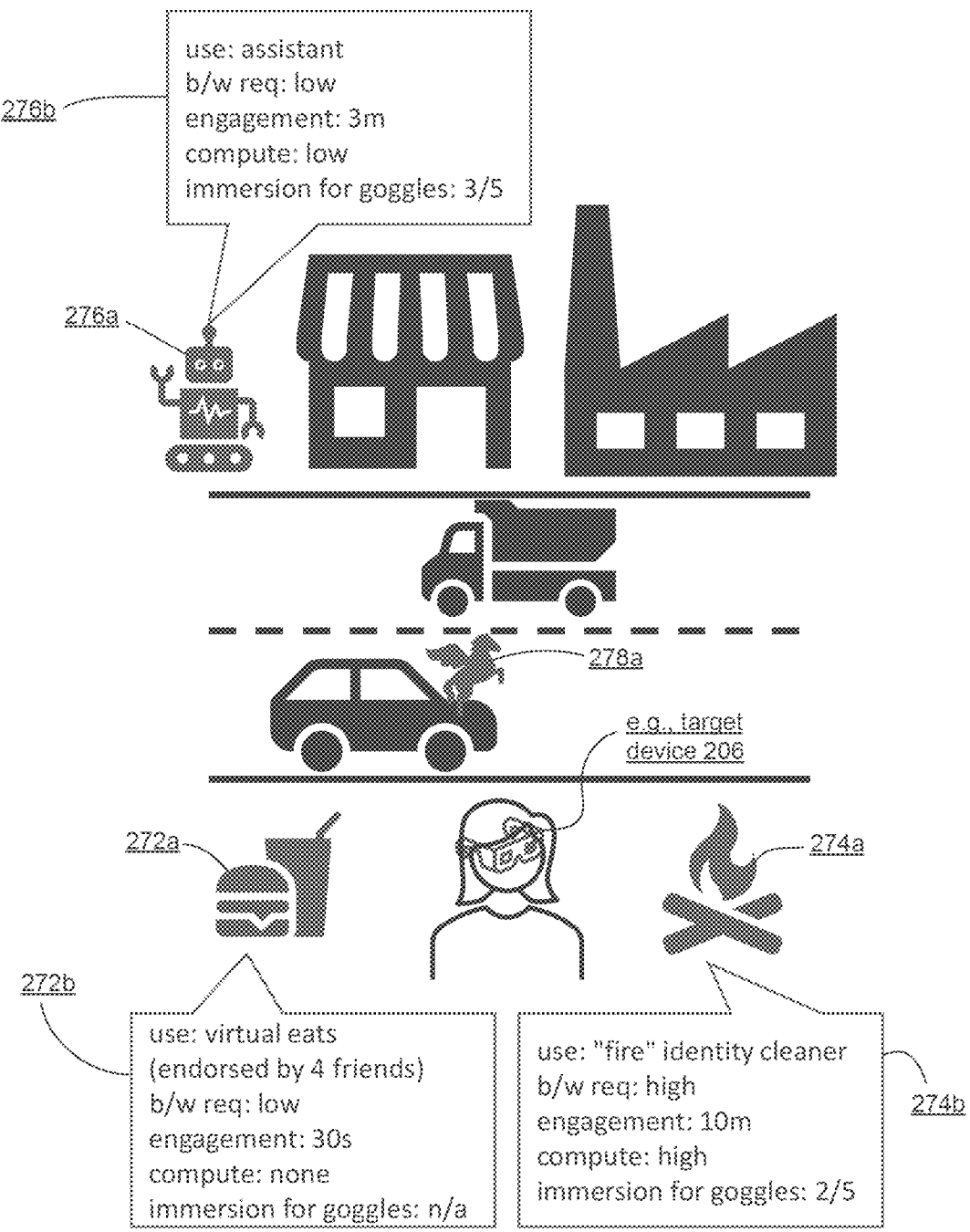
FIG. 2C is a diagram illustrating an example, non-limiting scenario in which one or more of the systems of FIGS. 2A and 2B facilitate automated generation of recommendations or reviews of metaverse objects in accordance with various aspects described herein.

FIG. 2C is a diagram illustrating an example, non-limiting scenario in which one or more of the systems of FIGS. 2A and 2B facilitate automated generation of recommendations or reviews of metaverse objects in accordance with various aspects described herein. Here, a user may be engaged in an immersive environment 270 where immersive objects may be geo-spatially anchored (i.e., AR). It is to be appreciated and understood, however, that the techniques described with respect to FIG. 2C can be similarly applied in a fully virtual metaverse environment.

As shown in FIG. 2C, an immersion evaluation platform or system, such as one or more of the systems described above with respect to FIG. 2A or 2B, may identify metaverse objects in the immersive environment 270—i.e., metaverse objects 272a, 274a, 276a, and 278a—and may selectively generate personalized recommendations or reviews of those metaverse objects—i.e., a recommendation or review object 272b for the metaverse object 272a, a recommendation or review object 274b for the metaverse object 274a, and a recommendation or review object 276b for the metaverse object 276a. Each of the recommendation or review objects 272b, 274b, 276b may include various elements of information (e.g., selected or derived in accordance with some or all of steps described above with respect to FIG. 2A and/or some or all of steps described above with respect to FIG. 2B), such as a summarization of compute/engagement metrics, user endorsements, device/system/network requirements, usage scenario/context, and so on. Here, threshold requirement(s) (e.g., relating to object relevancy, device/system/network capabilities, non-matching context, and/or other object-related information described elsewhere herein) for the metaverse object 278a may not have been satisfied, and thus the immersion evaluation platform or system may not provide a personalized recommendation or review of the metaverse object 278a for the user. Referring to FIG. 2C, an aggregated score that is specific to the current immersion target device 206 is represented with images or text in the "immersion for goggles" field or display. Contrasting 272b and 274b, for instance, the immersion evaluation platform or system may present a low score of 2 out of 5 stars for review 274b where goggles are used to experience the immersion (e.g., a low score should the user choose to experience the immersion using goggles 206), but may not have aggregated enough reviews (or imputed an estimation) either by device or by similar user for review 272b to present a score for that review attribute.

Figure 2D:
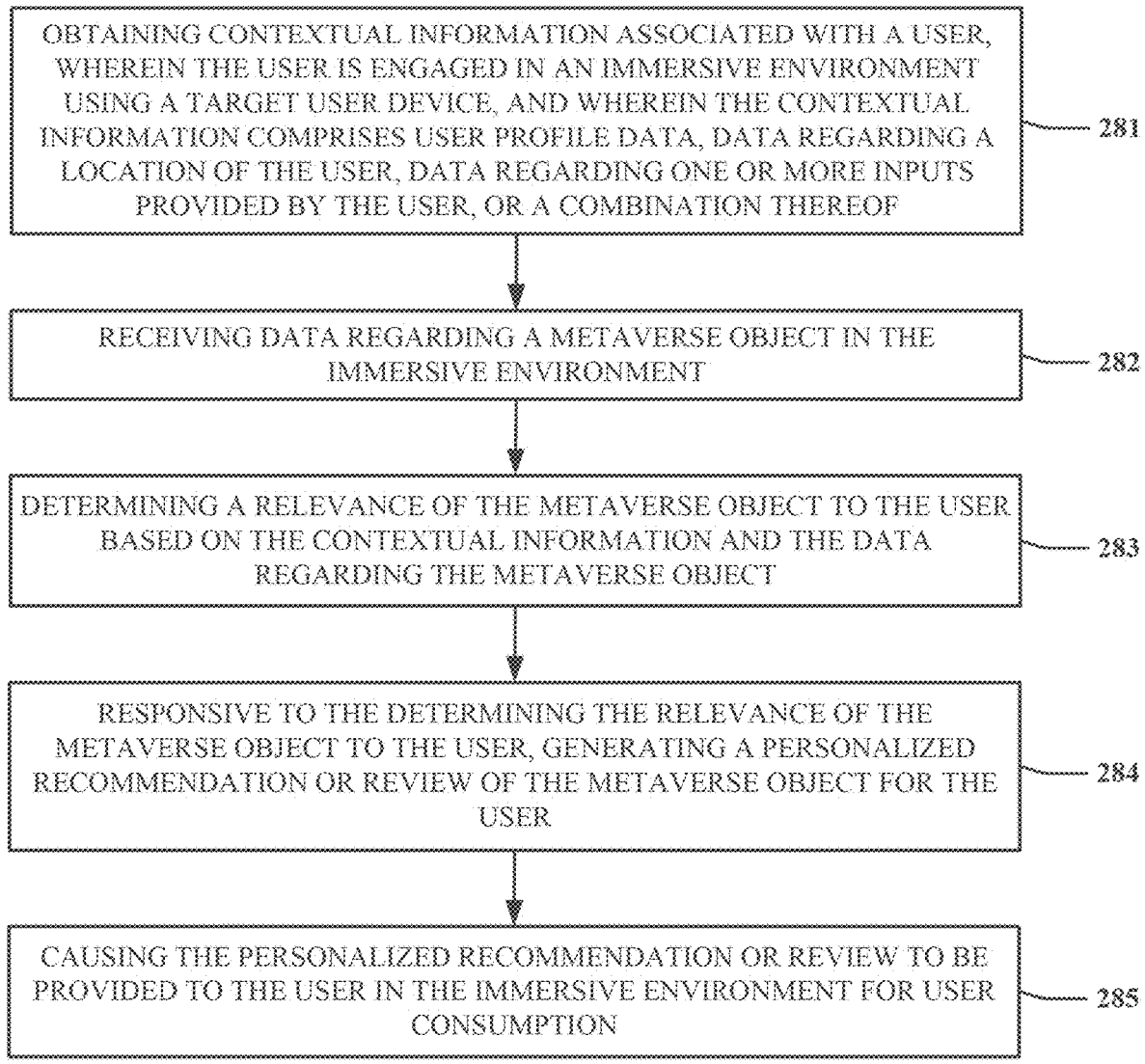
FIG. 2D depicts an illustrative embodiment of a method in accordance with various aspects described herein.

FIG. 2D depicts an illustrative embodiment of a method 280 in accordance with various aspects described herein. In some embodiments, one or more process blocks of FIG. 2D can be performed by an immersion evaluation platform or system, such as the immersion evaluation platform 202 of FIG. 2A and/or one or more devices/systems of FIG. 2B.

At 281, the method can include obtaining contextual information associated with a user, wherein the user is engaged in an immersive environment using a target user device, and wherein the contextual information comprises user profile data, data regarding a location of the user, data regarding one or more inputs provided by the user, or a combination thereof. For example, the immersion evaluation platform or system can, similar to that described above with respect to the system 200 of FIG. 2A and/or the system 250 of FIG. 2B, perform one or more operations that include obtaining contextual information associated with a user, wherein the user is engaged in an immersive environment using a target user device, and wherein the contextual information comprises user profile data, data regarding a location of the user, data regarding one or more inputs provided by the user, or a combination thereof.

At 282, the method can include receiving data regarding a metaverse object in the immersive environment. For example, the immersion evaluation platform or system can, similar to that described above with respect to the system 200 of FIG. 2A and/or the system 250 of FIG. 2B, perform one or more operations that include receiving data regarding a metaverse object in the immersive environment.

At 283, the method can include determining a relevance of the metaverse object to the user based on the contextual information and the data regarding the metaverse object. For example, the immersion evaluation platform or system can, similar to that described above with respect to the system 200 of FIG. 2A and/or the system 250 of FIG. 2B, perform one or more operations that include determining a relevance of the metaverse object to the user based on the contextual information and the data regarding the metaverse object.

At 284, the method can include, responsive to the determining the relevance of the metaverse object to the user, generating a personalized recommendation or review of the metaverse object for the user. For example, the immersion evaluation platform or system can, similar to that described above with respect to the system 200 of FIG. 2A and/or the system 250 of FIG. 2B, perform one or more operations that include, responsive to the determining the relevance of the metaverse object to the user, generating a personalized recommendation or review of the metaverse object for the user.

At 285, the method can include causing the personalized recommendation or review to be provided to the user in the immersive environment for user consumption. For example, the immersion evaluation platform or system can, similar to that described above with respect to the system 200 of FIG. 2A and/or the system 250 of FIG. 2B, perform one or more operations that include causing the personalized recommendation or review to be provided to the user in the immersive environment for user consumption.

In some implementations, the determining the relevance of the metaverse object to the user comprises determining a context or intent of the user based on the user profile data, the data regarding the location of the user, the data regarding the one or more inputs provided by the user, or the combination thereof.

In some implementations, the determining the relevance of the metaverse object to the user is performed using one or more models trained to predict user affinity to metaverse objects.

In some implementations, the immersion evaluation platform or system further obtains data regarding one or more external transactions associated with the user, where the determining the relevance of the metaverse object to the user is based on the data regarding the one or more external transactions.

In some implementations, the data regarding the metaverse object includes usage information associated with the metaverse object. In certain implementations, the usage information identifies requirements or objectives of the metaverse object, a level of complexity or sophistication of the metaverse object, inputs that are accepted by the metaverse object, outputs that the metaverse object is capable of providing, actual inputs that were received by the metaverse object during prior user engagements with the metaverse object, actual outputs that were provided by the metaverse object in relation to the prior user engagements, throughputs relating to the prior user engagements, network latencies experienced during the prior user engagements, specifications or capabilities of user devices employed for the prior user engagements, or a combination thereof. In various implementations, the usage information identifies statistics relating to prior user interactions with the metaverse object, where the statistics include a total or average engagement time for one or more users, a total or average number of return visits to the metaverse object by one or more users, user biometric data during interactions with the metaverse object, or a combination thereof.

In some implementations, the generating the personalized recommendation or review of the metaverse object is at least partially based on the contextual information and the data regarding the metaverse object.

In some implementations, the data regarding the metaverse object comprises one or more prior user reviews of the metaverse object, where the generating the personalized recommendation or review of the metaverse object is at least partially based on the one or more prior user reviews.

In some implementations, the immersion evaluation platform or system further obtains particular data regarding historical interactions with the metaverse object or other metaverse objects by social contacts relating to the user or by cohorts of the user, data regarding contexts or usage scenarios associated with the historical interactions, or a combination thereof, where the generating the personalized recommendation or review of the metaverse object is in accordance with identified similarities from evaluations of the particular data, the contextual information, and the data regarding the metaverse object.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, the subsystems and functions of system 250, and method 280 presented in FIGS. 1, 2A, 2B, and 2D. For example, virtualized communications network 300 can facilitate, in whole or in part, automated generation and coordination of personalized recommendations or reviews of metaverse objects.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
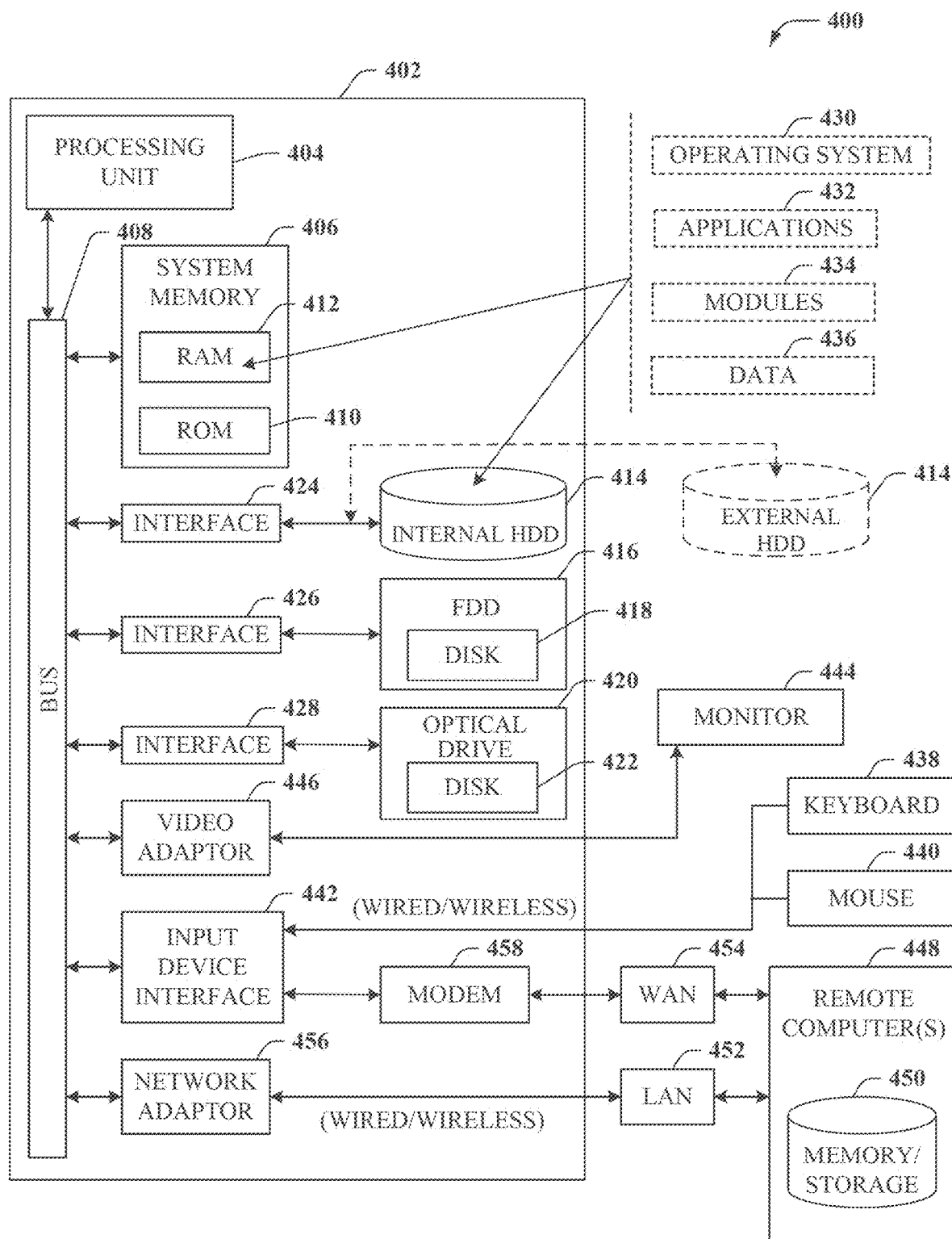
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, automated generation and coordination of personalized recommendations or reviews of metaverse objects.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
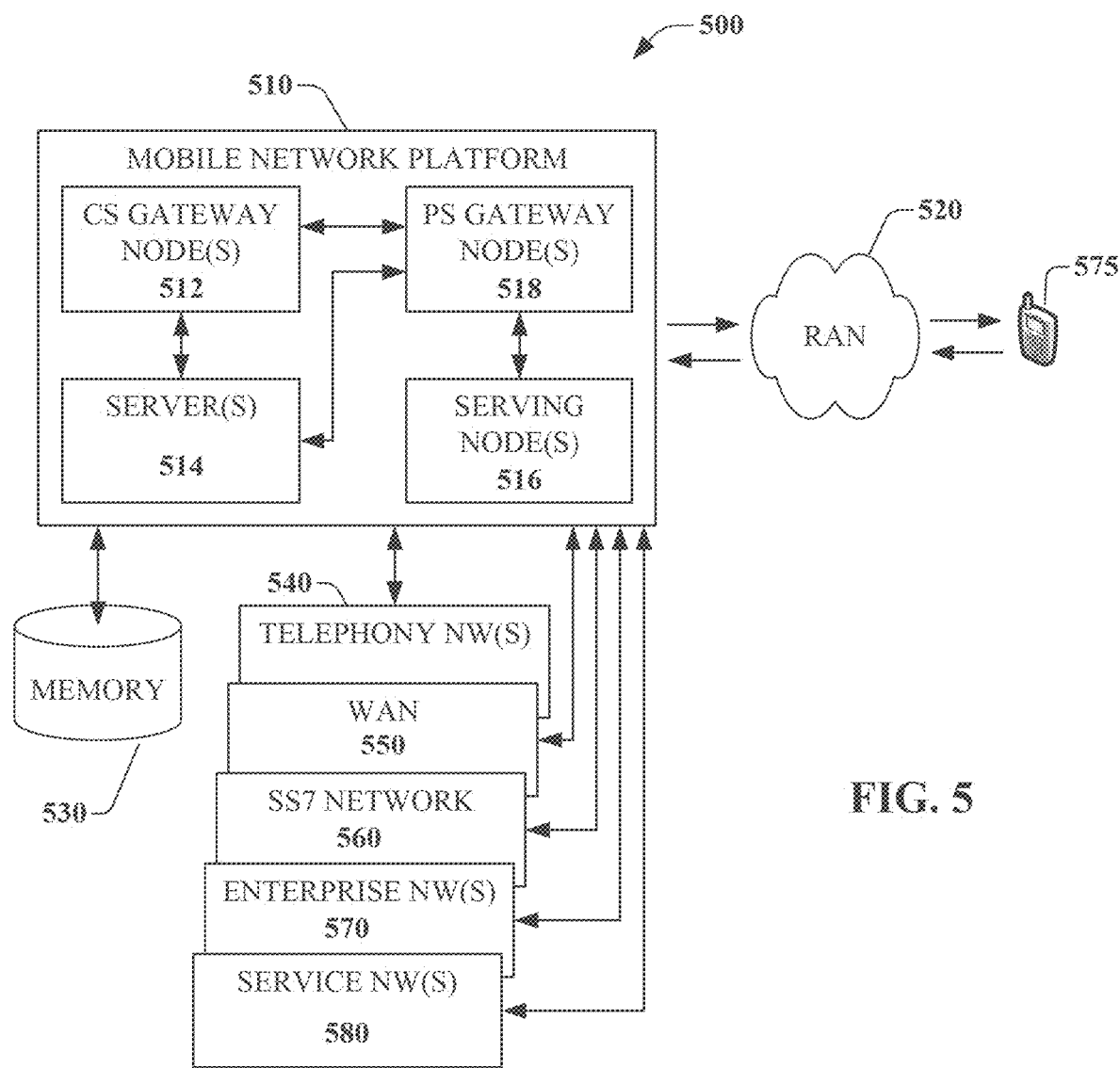
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, automated generation and coordination of personalized recommendations or reviews of metaverse objects. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500*l*, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
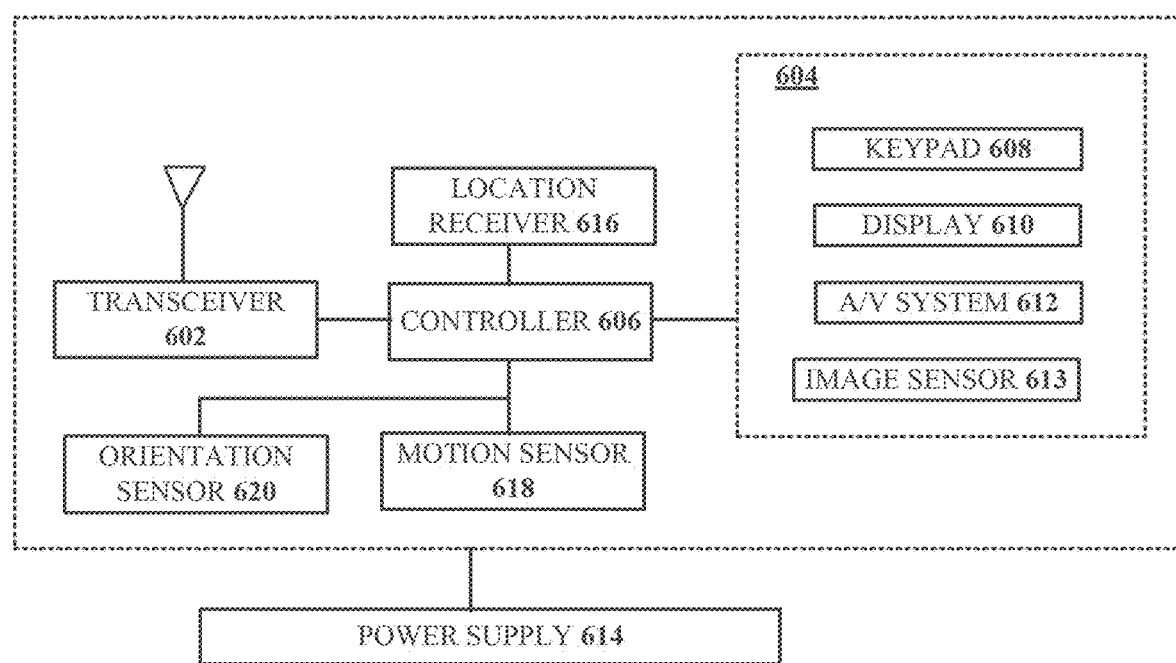
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, automated generation and coordination of personalized recommendations or reviews of metaverse objects.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
performing a first neural rendering of a metaverse object in a first immersive environment for a first user engaged in the first immersive environment using a first target user device, and capturing first parameters of the first neural rendering and first information regarding a first network latency experienced by the first target user device during the first neural rendering;
after the performing and the capturing, obtaining contextual information associated with a second user that is engaged in a second immersive environment using a second target user device and obtaining second information regarding a second network latency experienced by the second target user device, wherein the contextual information comprises user profile data, data regarding a location of the second user, data regarding one or more inputs provided by the second user, or a combination thereof;
determining whether a difference between the first network latency and the second network latency is less than a threshold; and
performing a second neural rendering of the metaverse object in the second immersive environment for the second user using the first parameters of the first neural rendering of the metaverse object for the first user based on a determination that the difference between the first network latency and the second network latency is less than the threshold, and otherwise performing a third neural rendering of the metaverse object for the second user based on parameters relating to one or more metaverse object attributes for the second user that are defined according to the contextual information associated with the second user,
wherein the third neural rendering is performed along with an embedding of a warning object, included in a personalized recommendation of the metaverse object for the second user, on a particular surface of the second immersive environment that is within a threshold distance from the metaverse object if the second network latency is determined to be greater than a particular threshold, thereby providing an alert of a potential device or connectivity issue during the third neural rendering.

2. The device of claim 1, wherein the operations further comprise determining a relevance of the metaverse object to the second user by determining a context or intent of the second user based on the user profile data, the data regarding the location of the second user, the data regarding the one or more inputs provided by the second user, or the combination thereof.

3. The device of claim 2, wherein the determining the relevance of the metaverse object to the second user is performed using one or more models trained to predict user affinity to metaverse objects.

4. The device of claim 2, wherein the operations further comprise obtaining data regarding one or more external transactions associated with the second user, and wherein the determining the relevance of the metaverse object to the second user is based on the data regarding the one or more external transactions.

5. The device of claim 1, wherein the operations further comprise receiving data regarding the metaverse object, and wherein the data regarding the metaverse object includes usage information associated with the metaverse object.

6. The device of claim 5, wherein the usage information identifies requirements or objectives of the metaverse object, a level of complexity or sophistication of the metaverse object, inputs that are accepted by the metaverse object, outputs that the metaverse object is capable of providing, actual inputs that were received by the metaverse object during prior user engagements with the metaverse object, actual outputs that were provided by the metaverse object in relation to the prior user engagements, throughputs relating to the prior user engagements, network latencies experienced during the prior user engagements, specifications or capabilities of user devices employed for the prior user engagements, or a combination thereof.

7. The device of claim 5, wherein the usage information identifies statistics relating to prior user interactions with the metaverse object, and wherein the statistics include a total or average engagement time for one or more users, a total or average number of return visits to the metaverse object by one or more users, user biometric data during interactions with the metaverse object, or a combination thereof.

8. The device of claim 5, wherein the operations further comprise generating the personalized recommendation of the metaverse object at least partially based on the data regarding the metaverse object.

9. The device of claim 8, wherein the data regarding the metaverse object comprises one or more prior user reviews of the metaverse object, and wherein the generating the personalized recommendation of the metaverse object is at least partially based on the one or more prior user reviews.

10. The device of claim 8, wherein the operations further comprise obtaining particular data regarding historical interactions with the metaverse object or other metaverse objects by social contacts relating to the second user or by cohorts of the second user, data regarding contexts or usage scenarios associated with the historical interactions, or a combination thereof, and wherein the generating the personalized recommendation of the metaverse object is in accordance with identified similarities from evaluations of the particular data, the contextual information, and the data regarding the metaverse object.

11. A non-transitory machine-readable medium, comprising executable instructions that, when executed by a processing system including a processor, facilitate performance of operations, the operations comprising:
  performing a first neural rendering of a metaverse object for a first user engaged in a first immersive environment using a first target user device, and capturing first parameters of the first neural rendering and first information regarding a first network latency experienced by the first target user device during the first neural rendering;
  after the performing and the capturing, obtaining contextual information associated with a second user that is engaged in a second immersive environment using a second target user device and obtaining second information regarding a second network latency experienced by the second target user device, wherein the contextual information comprises user profile data, data regarding a location of the second user, data regarding one or more inputs provided by the second user, or a combination thereof;
  determining whether a difference between the first network latency and the second network latency is less than a threshold; and
  performing a second neural rendering of the metaverse object in the second immersive environment for the second user using the first parameters of the first neural rendering of the metaverse object for the first user based on a determination that the difference between the first network latency and the second network latency is less than the threshold, and otherwise performing a third neural rendering of the metaverse object for the second user based on parameters relating to one or more object attributes for the second user that are defined according to the contextual information associated with the second user,
    wherein the third neural rendering is performed along with an embedding of a warning object, included in a personalized recommendation of the metaverse object for the second user, on a particular surface of the second immersive environment if the second network latency is determined to be greater than a particular threshold, thereby providing an alert of a potential issue during the third neural rendering.

12. The non-transitory machine-readable medium of claim 11, wherein the operations further comprise determining whether the second user has an affinity with the metaverse object.

13. The non-transitory machine-readable medium of claim 12, wherein the determining whether the second user has the affinity with the metaverse object is based on a comparison of an affinity score for the second user with an affinity threshold.

14. The non-transitory machine-readable medium of claim 12, wherein the operations further comprise deriving the personalized recommendation of the metaverse object for the second user by modifying content included in one or more prior user reviews of the metaverse object or by selecting sub-items of content included in the one or more prior user reviews.

15. The non-transitory machine-readable medium of claim 14, wherein the determining, the deriving, or both are based on a current time of day, a determined location of the second user, one or more determined short-term interests of the second user, one or more determined long-term interests of the second user, or a combination thereof.

16. A method, comprising:
  performing, by a processing system including a processor, a first neural rendering of a metaverse object for a first user engaged in a first immersive environment using one or more first target user devices, and capturing, by the processing system, first parameters of the first neural rendering and first information regarding a first network latency experienced by the one or more first target user devices during the first neural rendering;
  after the performing and the capturing, obtaining, by the processing system, contextual information associated with a second user that is engaged in a second immersive environment using one or more second target user devices and obtaining, by the processing system, second information regarding a second network latency experienced by the one or more second target user devices, wherein the contextual information comprises user profile data, data regarding a location of the second user, data regarding one or more inputs provided by the second user, or a combination thereof;
  determining, by the processing system, whether a difference between the first network latency and the second network latency is less than a threshold; and
  performing, by the processing system, a second neural rendering of the metaverse object in the second immersive environment for the second user using the first parameters of the first neural rendering of the metaverse object for the first user based on a determination that the difference between the first network latency and the second network latency is less than the threshold, and otherwise performing, by the processing system, a third neural rendering of the metaverse object for the second user based on parameters relating to one or more metaverse object attributes for the second user that are defined according to the contextual information associated with the second user,
    wherein the third neural rendering is performed along with an embedding of a warning object, included in a personalized recommendation of the metaverse object for the second user, on a particular surface of the second immersive environment that is within a threshold distance from the metaverse object if the second network latency is determined to be greater than a particular threshold, thereby providing an alert of a potential connectivity issue during the third neural rendering.

17. The method of claim 16, further comprising determining, by the processing system, whether the metaverse object is relevant to the second user based on detecting a user engagement with the metaverse object or based on detecting that the second user is within a threshold distance from the metaverse object.

18. The method of claim 16, wherein, responsive to a determination that the metaverse object is relevant to the second user, creating, by the processing system, the personalized recommendation of the metaverse object for the second user, and wherein the personalized recommendation includes engagement metrics associated with the metaverse object, usage information associated with the metaverse object, data regarding interactions associated with cohorts of the second user, biometric data, or a combination thereof.

19. The method of claim 18, wherein the creating the personalized recommendation involves translating content to be included in the personalized recommendation from a default language to a different language based on the one or more inputs or based on an analysis of the user profile data.

20. The method of claim 18, wherein the personalized recommendation of the metaverse object is different from another personalized recommendation of the metaverse object created by the processing system for a different user.

* * * * *